US010650468B2

(12) United States Patent
Hyman et al.

(10) Patent No.: US 10,650,468 B2
(45) Date of Patent: May 12, 2020

(54) SYSTEMS AND METHODS FOR AUTOMATED MATCHING AND CONVERSION OF TERM LIFE INSURANCE POLICIES

(71) Applicant: Integrated Plan Design LLC, Purchase, NY (US)

(72) Inventors: Andrew Alan Hyman, Harrison, NY (US); Jon Franklin Davis, Urbandale, IA (US); Jeffrey Young, Dobbs Ferry, NY (US)

(73) Assignee: INTEGRATED PLAN DESIGN LLC, Purchase, NY (US)

( * ) Notice: Subject to any disclaimer, the term of this patent is extended or adjusted under 35 U.S.C. 154(b) by 0 days.

(21) Appl. No.: 16/388,317

(22) Filed: Apr. 18, 2019

(65) Prior Publication Data

US 2019/0244305 A1 Aug. 8, 2019

Related U.S. Application Data

(63) Continuation of application No. 14/476,219, filed on Sep. 3, 2014, now Pat. No. 10,311,520.

(60) Provisional application No. 61/873,170, filed on Sep. 3, 2013.

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC ..................................................... G06Q 40/00
USPC ........................................................... 705/4
See application file for complete search history.

(56) References Cited

U.S. PATENT DOCUMENTS

2005/0234791 A1* 10/2005 Krasnerman .......... G06Q 40/00 705/35

OTHER PUBLICATIONS

The Ohio National Cos. (1992). Financial Services Week: 32., Thomson Financial Inc. Dec. 14, 1992 (2 pgs) Retrieved from ttps://dialog.proquest.com/professional/docview/672316339/fulltext/168909691382FOAB. . . .

* cited by examiner

*Primary Examiner* — Ojo O Oyebisi
(74) *Attorney, Agent, or Firm* — Cowan, Liebowitz & Latman, P.C.; Mark Montague; Daniel Basov

(57) ABSTRACT

An exemplary aspect comprises a computer system with a receiving component that receives application information for an insurance policy that extends the term of an existing life insurance product, and is pre-paid for by a third party, the third party to be paid fees based on the customer's selection of one of a first option providing the customer with the right of first refusal to continue the insurance policy, and a second option providing the third party with the right of first refusal to continue the insurance policy; an underwriting component that determines whether the customer qualifies for the insurance policy; a pricing component that calculates the fees to be paid by the customer to the third party; and a closing component that provides relevant closing documentation for the insurance policy to at least the customer, the insurance company, and the third party.

24 Claims, 14 Drawing Sheets

FIG. 2

Term Lifextender℠ Fund

Modeled Stochastic Fund Cashflows (Base Case Scenarios)

| Year | Term Extension Fees | Death Benefits | Policy Premiums | All Expenses, Fees and Profit Share | Net Profit |
|---|---|---|---|---|---|
| 1 | $6,161,209 | $229,296 | -$50,050,000 | -$2,944,764 | -$46,604,280 |
| 2 | $18,149,601 | $958,471 | -$100,100,000 | -$8,532,532 | -$87,524,460 |
| 3 | $17,149,878 | $1,856,841 | $0 | -$5,077,464 | $13,929,254 |
| 4 | $16,159,264 | $3,002,961 | $0 | -$5,096,035 | $14,066,190 |
| 5 | $15,183,293 | $4,378,303 | $0 | -$5,182,810 | $14,378,785 |
| 6 | $14,224,331 | $5,981,994 | $0 | -$5,336,586 | $14,869,740 |
| 7 | $11,944,403 | $9,617,028 | -$2,155,636 | -$5,157,031 | $14,248,763 |
| 8 | $7,604,143 | $16,799,018 | -$7,882,961 | -$4,376,504 | $12,143,696 |
| 9 | $4,834,416 | $23,307,352 | -$11,660,634 | -$4,161,275 | $12,319,858 |
| 10 | $2,927,027 | $29,439,377 | -$14,531,151 | -$4,497,661 | $13,337,593 |
| 11 | $1,222,003 | $36,005,815 | -$16,429,405 | -$5,392,911 | $15,405,501 |
| 12 | $0 | $42,197,068 | -$16,730,601 | -$6,710,085 | $18,756,381 |
| 13 | $0 | $45,893,051 | -$18,030,678 | -$7,066,001 | $20,796,372 |
| 14 | $0 | $49,493,864 | -$19,583,531 | -$7,603,520 | $22,306,813 |
| 15 | $0 | $52,857,760 | -$21,384,426 | -$7,977,501 | $23,495,834 |
| 16 | $0 | $56,062,682 | -$22,870,613 | -$8,386,579 | $24,805,490 |
| 17 | $0 | $58,696,382 | -$24,436,848 | -$8,578,803 | $25,680,731 |
| 18 | $0 | $61,241,816 | -$26,148,216 | -$8,687,793 | $26,405,807 |
| 19 | $0 | $63,334,382 | -$27,396,276 | -$8,806,522 | $27,131,584 |
| 20 | $0 | $64,676,119 | -$28,382,373 | -$8,764,550 | $27,529,196 |
| 21 | $0 | $65,264,031 | -$28,122,815 | -$8,884,168 | $28,257,048 |
| 22 | $0 | $64,906,134 | -$27,578,549 | -$8,790,590 | $28,536,995 |
| 23 | $0 | $63,438,275 | -$27,278,488 | -$8,300,072 | $27,857,715 |
| 24 | $0 | $60,931,918 | -$25,968,588 | -$7,805,460 | $27,157,870 |
| 25 | $0 | $57,299,215 | -$24,027,857 | -$7,187,197 | $26,084,162 |
| 26 | $0 | $36,190,727 | -$15,085,725 | -$3,223,445 | $17,881,557 |

Assumptions

Investment: $150mm
Max Fund Term: 25yrs
Base Case Assumptions*

Modeled Stochastic Fund IRR¹

11.4%

*Mortality Based on 90% of 2008 VBT Table, 1.0% Mortality Improvement Years 1-25, Insurance Company Current Premium Assumptions, 5.0% Defaults Per Years 2-10, Results Based on 1,000 Monte Carlo Simulations of Mortality.

¹Please review the Disclaimer on Page 6 of this presentation.

CANACCORD Genuity

FIG. 4

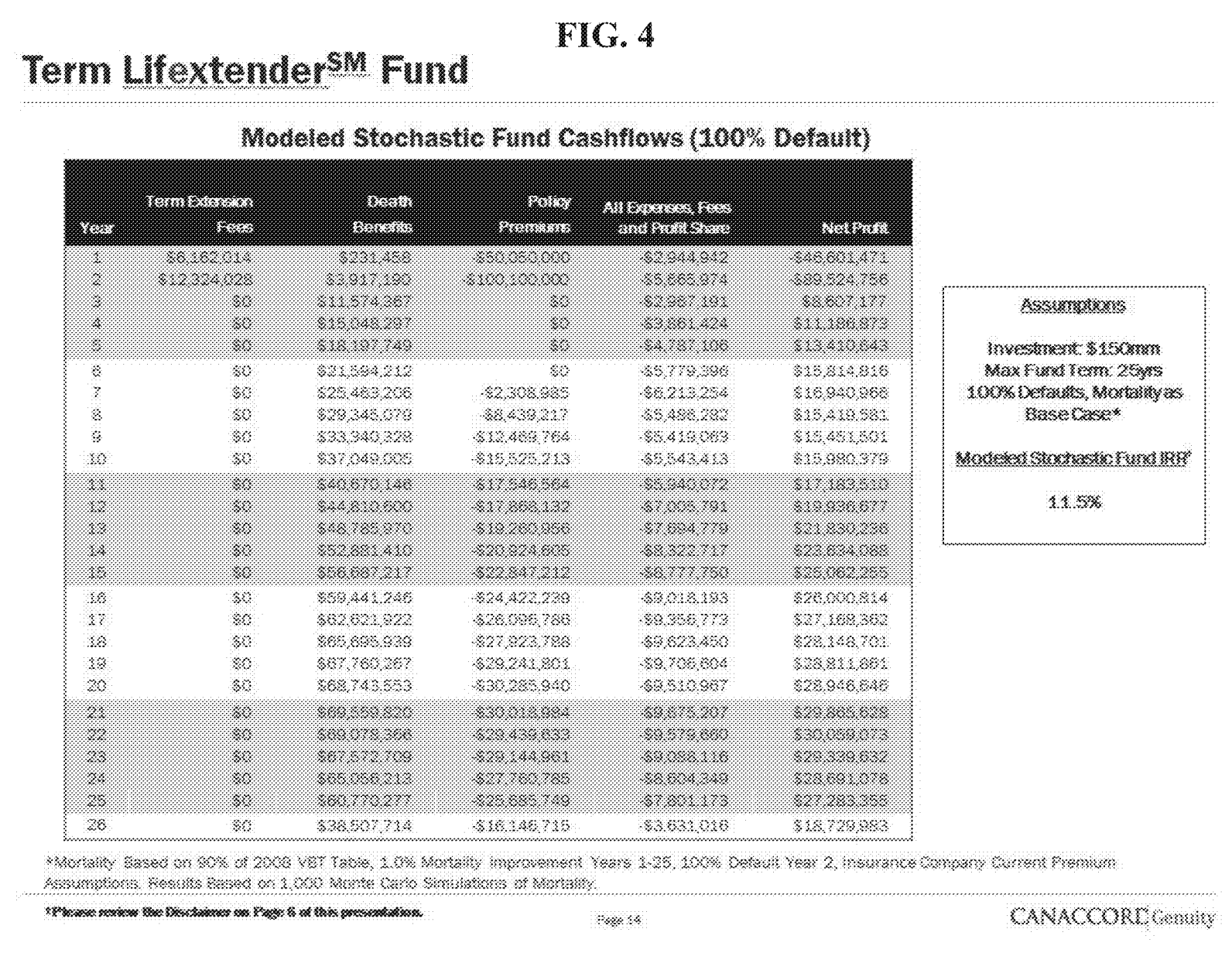

Term Lifextender[SM] Fund

Modeled Stochastic Fund Cashflows (100% Default)

| Year | Term Extension Fees | Death Benefits | Policy Premiums | All Expenses, Fees and Profit Share | Net Profit |
|---|---|---|---|---|---|
| 1 | $6,162,014 | $231,458 | -$50,050,000 | -$2,944,942 | -$46,601,471 |
| 2 | $12,324,028 | $3,917,190 | -$100,100,000 | -$5,665,974 | -$89,524,756 |
| 3 | $0 | $11,574,367 | $0 | -$2,967,191 | $8,607,177 |
| 4 | $0 | $15,048,297 | $0 | -$3,861,424 | $11,186,873 |
| 5 | $0 | $18,197,749 | $0 | -$4,787,106 | $13,410,643 |
| 6 | $0 | $21,594,212 | $0 | -$5,779,396 | $15,814,816 |
| 7 | $0 | $25,463,206 | -$2,308,985 | -$6,213,254 | $16,940,968 |
| 8 | $0 | $29,346,079 | -$8,439,217 | -$5,498,282 | $15,419,581 |
| 9 | $0 | $33,340,328 | -$12,469,764 | -$5,419,069 | $15,451,501 |
| 10 | $0 | $37,049,005 | -$15,525,213 | -$5,543,413 | $15,980,379 |
| 11 | $0 | $40,670,146 | -$17,546,564 | -$5,940,072 | $17,183,510 |
| 12 | $0 | $44,610,600 | -$17,668,132 | -$7,005,791 | $19,936,677 |
| 13 | $0 | $48,785,970 | -$19,280,956 | -$7,694,779 | $21,830,236 |
| 14 | $0 | $52,681,410 | -$20,824,605 | -$8,322,717 | $23,634,088 |
| 15 | $0 | $56,687,217 | -$22,847,212 | -$8,777,750 | $25,062,255 |
| 16 | $0 | $59,441,246 | -$24,422,239 | -$9,018,193 | $26,000,814 |
| 17 | $0 | $62,621,922 | -$26,096,788 | -$9,356,773 | $27,168,362 |
| 18 | $0 | $65,695,939 | -$27,923,788 | -$9,623,450 | $28,148,701 |
| 19 | $0 | $67,760,267 | -$29,241,801 | -$9,706,604 | $28,811,861 |
| 20 | $0 | $68,743,553 | -$30,285,940 | -$9,510,967 | $28,946,646 |
| 21 | $0 | $69,559,820 | -$30,018,984 | -$9,675,207 | $29,865,629 |
| 22 | $0 | $69,078,366 | -$29,439,633 | -$9,579,660 | $30,059,073 |
| 23 | $0 | $67,572,709 | -$29,144,961 | -$9,098,116 | $29,329,632 |
| 24 | $0 | $65,056,212 | -$27,760,785 | -$8,604,349 | $28,691,078 |
| 25 | $0 | $60,770,277 | -$25,685,749 | -$7,801,173 | $27,283,355 |
| 26 | $0 | $38,507,714 | -$16,146,715 | -$3,631,016 | $18,729,983 |

*Mortality Based on 90% of 2008 VBT Table, 1.0% Mortality Improvement Years 1-25, 100% Default Year 2, Insurance Company Current Premium Assumptions. Results Based on 1,000 Monte Carlo Simulations of Mortality.

Assumptions

Investment: $150mm
Max Fund Term: 25yrs
100% Defaults, Mortality as Base Case*

Modeled Stochastic Fund IRR[†]

11.5%

FIG. 5: Modeled Stochastic Fund Cashflows (100% Default, Mortality Improvement)

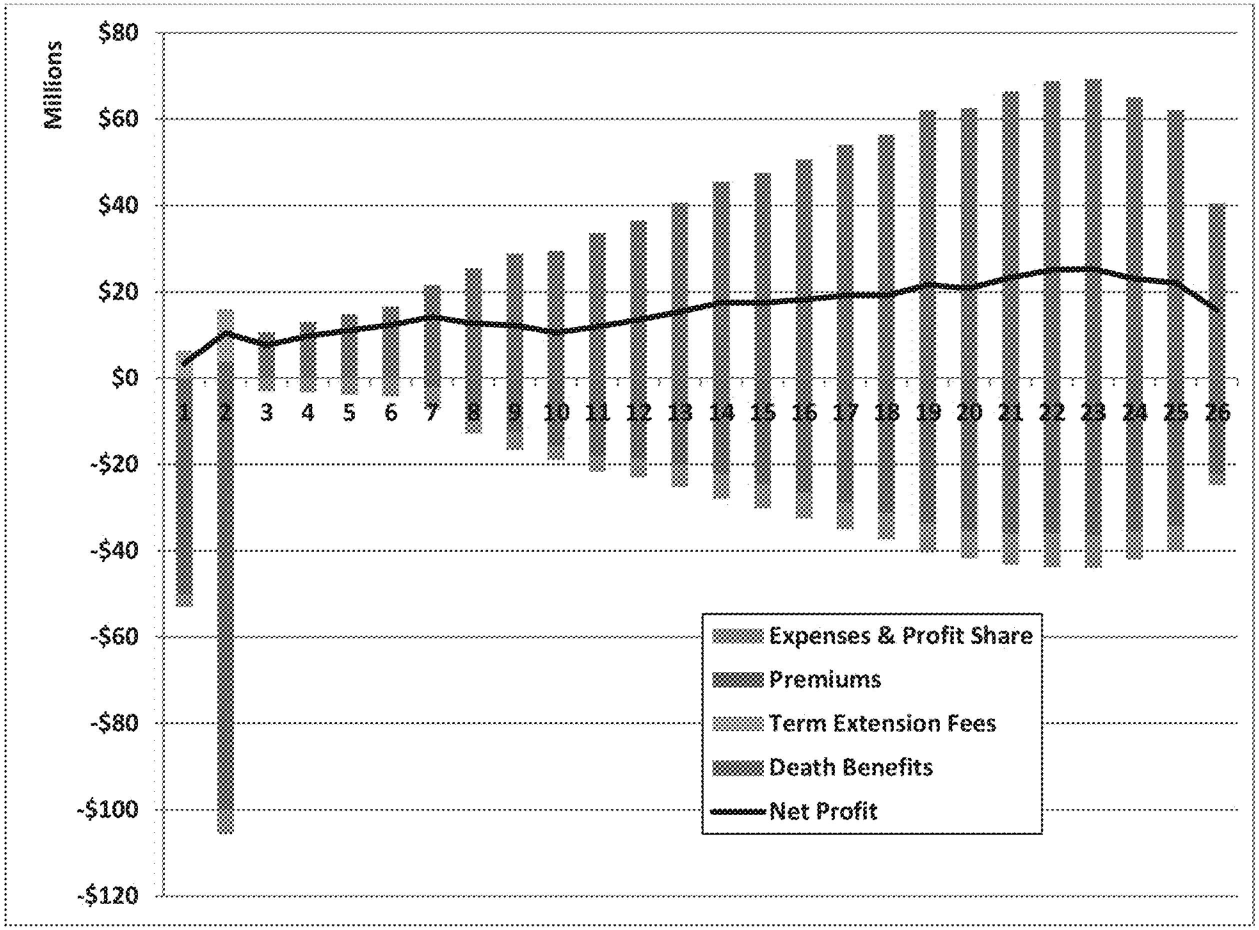

Assumptions
Investment: $150mm
Max Fund Term: 25yrs
100% Default, Mortality Improvement*
Modeled Stochastic Fund IRR†
8.7%

*Mortality Based on 90% of 2008 VBT Table, Mortality 20% Improvement, 100% Default Year 2, Insurance Company Current Premium Assumptions.
Results Based on 1,000 Monte Carlo Simulations of Mortality.

Term Lifextender℠ Fund

Modeled Stochastic Fund Cashflows (100% Default, Mortality Improvement)

| Year | Term Extension Fees | Death Benefits | Policy Premiums | All Expenses, Fees and Profit Share | Profit | Total Cash Flow |
|---|---|---|---|---|---|---|
| 1 | $8,158,768 | $200,258 | -$50,050,000 | -$2,934,602 | $3,424,423 | -$48,625,577 |
| 2 | $12,317,532 | $3,716,287 | -$100,100,000 | -$5,610,436 | $10,423,383 | -$89,676,617 |
| 3 | $0 | $10,642,705 | $0 | -$2,985,685 | $7,657,021 | $7,657,021 |
| 4 | $0 | $13,009,288 | $0 | -$3,267,555 | $9,741,732 | $9,741,732 |
| 5 | $0 | $14,843,879 | $0 | -$3,800,617 | $11,043,262 | $11,043,262 |
| 6 | $0 | $16,575,190 | $0 | -$4,276,309 | $12,298,880 | $12,298,880 |
| 7 | $0 | $21,515,588 | -$2,324,968 | -$5,006,518 | $14,184,102 | $14,184,102 |
| 8 | $0 | $25,453,488 | -$8,513,657 | -$4,282,406 | $12,651,426 | $12,651,426 |
| 9 | $0 | $28,829,382 | -$12,605,795 | -$4,033,954 | $12,189,633 | $12,189,633 |
| 10 | $0 | $29,492,142 | -$15,737,368 | -$3,229,820 | $10,524,954 | $10,524,954 |
| 11 | $0 | $33,603,497 | -$17,978,298 | -$3,725,812 | $11,899,399 | $11,899,399 |
| 12 | $0 | $36,480,068 | -$18,576,911 | -$4,349,004 | $13,554,154 | $13,554,154 |
| 13 | $0 | $40,554,522 | -$20,214,218 | -$5,002,840 | $15,337,664 | $15,337,664 |
| 14 | $0 | $45,516,278 | -$22,193,255 | -$5,815,001 | $17,508,022 | $17,508,022 |
| 15 | $0 | $47,595,567 | -$24,513,691 | -$5,652,782 | $17,429,095 | $17,429,095 |
| 16 | $0 | $50,607,314 | -$26,595,609 | -$5,845,153 | $18,166,552 | $18,166,552 |
| 17 | $0 | $54,124,961 | -$28,874,319 | -$6,122,836 | $19,127,806 | $19,127,806 |
| 18 | $0 | $56,435,837 | -$31,443,998 | -$5,906,671 | $19,085,168 | $19,085,168 |
| 19 | $0 | $62,069,303 | -$33,643,848 | -$6,795,758 | $21,629,697 | $21,629,697 |
| 20 | $0 | $62,557,857 | -$35,482,740 | -$6,268,473 | $20,800,644 | $20,800,644 |
| 21 | $0 | $66,465,009 | -$36,011,814 | -$7,145,172 | $23,308,023 | $23,308,023 |
| 22 | $0 | $68,870,053 | -$36,117,988 | -$7,700,429 | $25,051,626 | $25,051,626 |
| 23 | $0 | $69,324,155 | -$36,449,189 | -$7,572,393 | $25,302,573 | $25,302,573 |
| 24 | $0 | $65,030,006 | -$35,646,871 | -$6,363,293 | $23,020,042 | $23,020,042 |
| 25 | $0 | $62,108,224 | -$34,291,407 | -$5,746,568 | $22,070,249 | $22,070,249 |
| 26 | $0 | $40,454,279 | -$22,207,962 | -$2,485,407 | $15,760,910 | $15,760,910 |

Assumptions

Investment: $150mm
Max Fund Term: 25yrs
100% Default, Mortality Improvement*

Modeled Stochastic Fund IRR†

8.7%

*Morality Based on 90% of 2008 VBT Table, Morality 20% Improvement, 100% Default Year 2, Insurance Company Current Premium Assumptions. Results Based on 1,000 Monte Carlo Simulations of Morality.

†Please review the Disclaimer on Page 6 of this presentation.

CANACCORD Genuity

CANACCORD Genuity

Term Lifextender$^{SM}$ The Opportunity

Distribution

IPD is developing a unique distribution system to integrate with the existing national life insurance distribution system to offer Term Lifextender$^{SM}$ as a new sales opportunity and revenue source for agents and general agents.

CANACCORD Genuity

FIG. 9

Term Lifextender[SM] Case Study

Investor's Prospective[†]

Percentage return to fund on an individual policy dependent upon the possible outcomes.

| Year of Death | Option 1 - Fund Retains Policy | Option 1 - Client Retains Policy | Option 1 - Client Default Year 2 | Option 2 - No Default | Option 2 - Client Default Year 2 |
|---|---|---|---|---|---|
| 1 | 11.6% | 11.6% | 11.6% | 7.2% | 7.2% |
| 2 | 11.6% | 11.6% | 174.6% | 7.2% | 169.2% |
| 3 | 11.6% | 11.6% | 96.1% | 7.2% | 93.5% |
| 4 | 11.6% | 11.6% | 65.7% | 7.2% | 64.1% |
| 5 | 11.6% | 11.6% | 49.8% | 7.2% | 48.6% |
| 6 | 11.6% | 11.6% | 40.0% | 7.2% | 39.1% |
| 7 | 11.6% | 11.6% | 33.5% | 7.2% | 32.7% |
| 8 | 11.6% | 11.6% | 28.7% | 7.2% | 28.1% |
| 9 | 11.6% | 11.6% | 25.2% | 7.2% | 24.6% |
| 10 | 11.6% | 11.6% | 25.2% | 7.2% | 24.6% |
| 11 | 25.6% | n/a | 20.0% | 22.9% | 19.5% |
| 12 | 23.4% | n/a | 17.9% | 20.8% | 17.5% |
| 13 | 21.5% | n/a | 16.1% | 19.0% | 15.8% |
| 14 | 19.8% | n/a | 14.6% | 17.3% | 14.2% |
| 15 | 18.2% | n/a | 13.1% | 15.9% | 12.9% |
| 16 | 16.8% | n/a | 11.9% | 14.5% | 11.6% |
| 17 | 15.5% | n/a | 10.7% | 13.2% | 10.4% |
| 18 | 14.2% | n/a | 9.5% | 12.0% | 9.3% |
| 19 | 12.9% | n/a | 8.5% | 10.8% | 8.3% |
| 20 | 11.7% | n/a | 7.4% | 9.6% | 7.2% |
| 21 | 10.4% | n/a | 6.3% | 8.5% | 6.2% |
| 22 | 9.1% | n/a | 5.2% | 7.2% | 5.1% |
| 23 | 7.7% | n/a | 4.1% | 6.0% | 4.0% |
| 24 | 6.1% | n/a | 3.0% | 4.6% | 2.9% |
| 25 | 4.5% | n/a | 1.8% | 3.2% | 1.7% |

†Please review the Disclaimer on Page 6 of this presentation.

Term Extension Fee Calculation

| | | | |
|---|---|---|---|
| Base Table | 2008 VBT NonSmoker, Age Near Birthday | | |
| x (issue age) | 69 | A | 188483.7430 |
| n (term extension Period) | 10 | B | 22822.5468 |
| w (terminal age) | 93 | C | 129430.7565 |
| Table | 3 | D | 6.028387598 |
| imp (Mortality Improvement) | 0.01 | | |
| i (Discount Rate) | 0.12 | Term Extension Fee | $13,581.66 |

| | A | B |
|---|---|---|
| | 188,483.74 | 22,822.55 |

| Age (x) | Duration (t) | baseq(x) | q(x) | l(x) | d(x) | D(x) | N(x) | C(x) | M(x) | Prem(x) | Exp(x) | Prem(x)*D(x+t-1) | Exp(t)*D(x+t-1) |
|---|---|---|---|---|---|---|---|---|---|---|---|---|---|
| 69 | 1 | 0.00327 | 0.005723 | 10000000 | 57225 | 8928571 | 66255712 | 48279 | 1936420 | $148,000 | $13,320 | $1,321,428,571,429 | $118,928,571,429 |
| 70 | 2 | 0.00513 | 0.008888 | 9942775 | 88369 | 7926319 | 57327141 | 66566 | 1888141 | $0 | $1,480 | $0 | $11,730,952,647 |
| 71 | 3 | 0.00707 | 0.012126 | 9854406 | 119497 | 7014172 | 49400821 | 80370 | 1821575 | $0 | $1,480 | $0 | $10,380,974,255 |
| 72 | 4 | 0.00913 | 0.015503 | 9734909 | 150920 | 6186711 | 42386649 | 90629 | 1741205 | $0 | $1,480 | $0 | $9,156,331,767 |
| 73 | 5 | 0.01136 | 0.019097 | 9583989 | 183022 | 5438213 | 36199939 | 98131 | 1650576 | $0 | $1,480 | $0 | $8,048,554,994 |
| 74 | 6 | 0.01380 | 0.022966 | 9400967 | 215906 | 4762822 | 30761726 | 103359 | 1552446 | $0 | $1,480 | $0 | $7,048,977,291 |
| 75 | 7 | 0.01647 | 0.027136 | 9185061 | 249244 | 4154855 | 25998903 | 106534 | 1449087 | $0 | $1,480 | $0 | $6,149,185,349 |
| 76 | 8 | 0.01942 | 0.031676 | 8935817 | 283053 | 3609026 | 21844048 | 108023 | 1342552 | $0 | $1,480 | $0 | $5,341,359,120 |
| 77 | 9 | 0.02268 | 0.036624 | 8652763 | 316897 | 3120273 | 18235022 | 107981 | 1234530 | $0 | $1,480 | $0 | $4,618,004,412 |
| 78 | 10 | 0.02628 | 0.042013 | 8335867 | 350212 | 2683926 | 15114749 | 106547 | 1126549 | $0 | $1,480 | $0 | $3,972,210,566 |
| 79 | 11 | 0.03028 | 0.047923 | 7985655 | 382698 | 2295685 | 12430823 | 103956 | 1020002 | $16,000 | $1,480 | $36,730,959,853 | $3,397,613,786 |
| 80 | 12 | 0.03470 | 0.054369 | 7602957 | 413368 | 1951490 | 10135138 | 100256 | 916046 | $18,000 | $1,480 | $35,126,813,664 | $2,888,204,679 |
| 81 | 13 | 0.03975 | 0.061659 | 7189589 | 443304 | 1647668 | 8183648 | 95997 | 815790 | $21,000 | $1,480 | $34,601,030,559 | $2,438,548,820 |
| 82 | 14 | 0.04535 | 0.069642 | 6746285 | 469827 | 1380423 | 6535980 | 90840 | 719792 | $25,000 | $1,480 | $34,510,587,274 | $2,043,026,767 |
| 83 | 15 | 0.05151 | 0.078311 | 6276458 | 491515 | 1146685 | 5155556 | 84851 | 628953 | $29,000 | $1,480 | $33,253,877,332 | $1,697,094,429 |
| 84 | 16 | 0.05825 | 0.087672 | 5784943 | 507179 | 943649 | 4008871 | 78174 | 544102 | $32,000 | $1,480 | $30,196,783,866 | $1,396,601,254 |
| 85 | 17 | 0.06817 | 0.101577 | 5277764 | 536098 | 768676 | 3065222 | 73778 | 465927 | $36,000 | $1,480 | $27,672,353,674 | $1,137,641,207 |
| 86 | 18 | 0.07935 | 0.117053 | 4741666 | 555027 | 616604 | 2296545 | 68199 | 392149 | $42,000 | $1,480 | $25,897,380,206 | $912,574,350 |
| 87 | 19 | 0.09194 | 0.134269 | 4186639 | 562136 | 486097 | 1679941 | 61672 | 323949 | $48,000 | $1,480 | $23,332,662,247 | $719,423,753 |
| 88 | 20 | 0.10626 | 0.153630 | 3624503 | 556833 | 375740 | 1193844 | 54545 | 262277 | $54,000 | $1,480 | $20,289,984,591 | $556,095,874 |
| 89 | 21 | 0.12230 | 0.175053 | 3067670 | 537003 | 283942 | 818103 | 46967 | 207732 | $61,000 | $1,480 | $17,320,480,473 | $420,234,608 |
| 90 | 22 | 0.13933 | 0.197434 | 2530666 | 499639 | 209141 | 534161 | 39017 | 160765 | $70,000 | $1,480 | $14,639,842,730 | $309,528,103 |
| 91 | 23 | 0.15634 | 0.219322 | 2031027 | 445449 | 149865 | 325020 | 31058 | 121749 | $79,000 | $1,480 | $11,839,360,358 | $221,800,675 |
| 92 | 24 | 0.17428 | 0.242044 | 1585578 | 383780 | 104461 | 175155 | 23891 | 90691 | $88,000 | $1,480 | $9,192,585,357 | $154,602,572 |
| 93 | 25 | 0.19310 | 0.265500 | 1201798 | 1201798 | 70694 | 70694 | 66799 | 66799 | $97,000 | $1,480 | $6,857,289,186 | $104,626,680 |
| | | | | | | | | | | | sum | 1,682,890,562,799.53 | 203,772,739,386.92 |

FIG. 12

FIG. 13 - Sales Work Flow
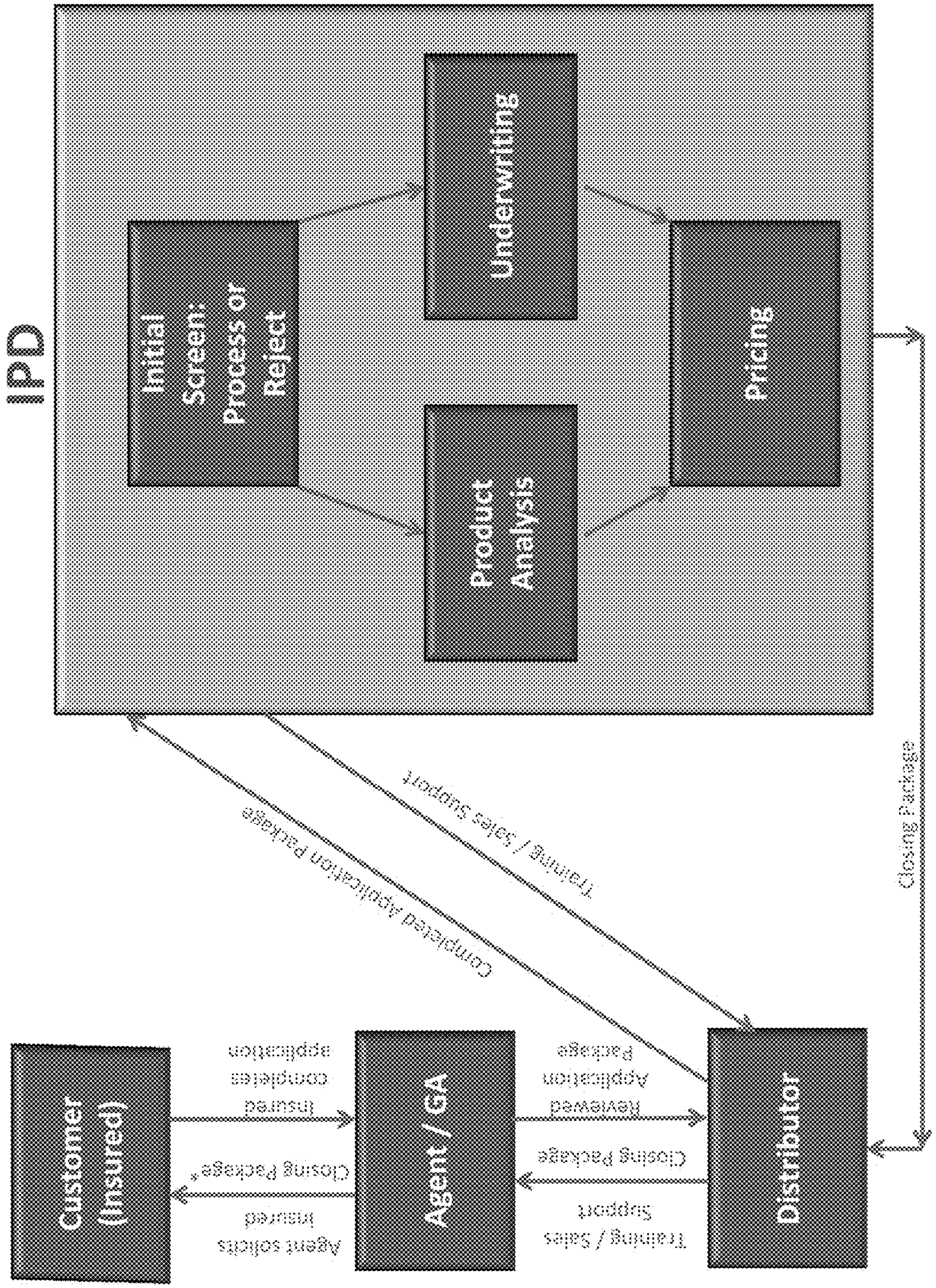

FIG. 14 - Closing Cash & Documentation Flow
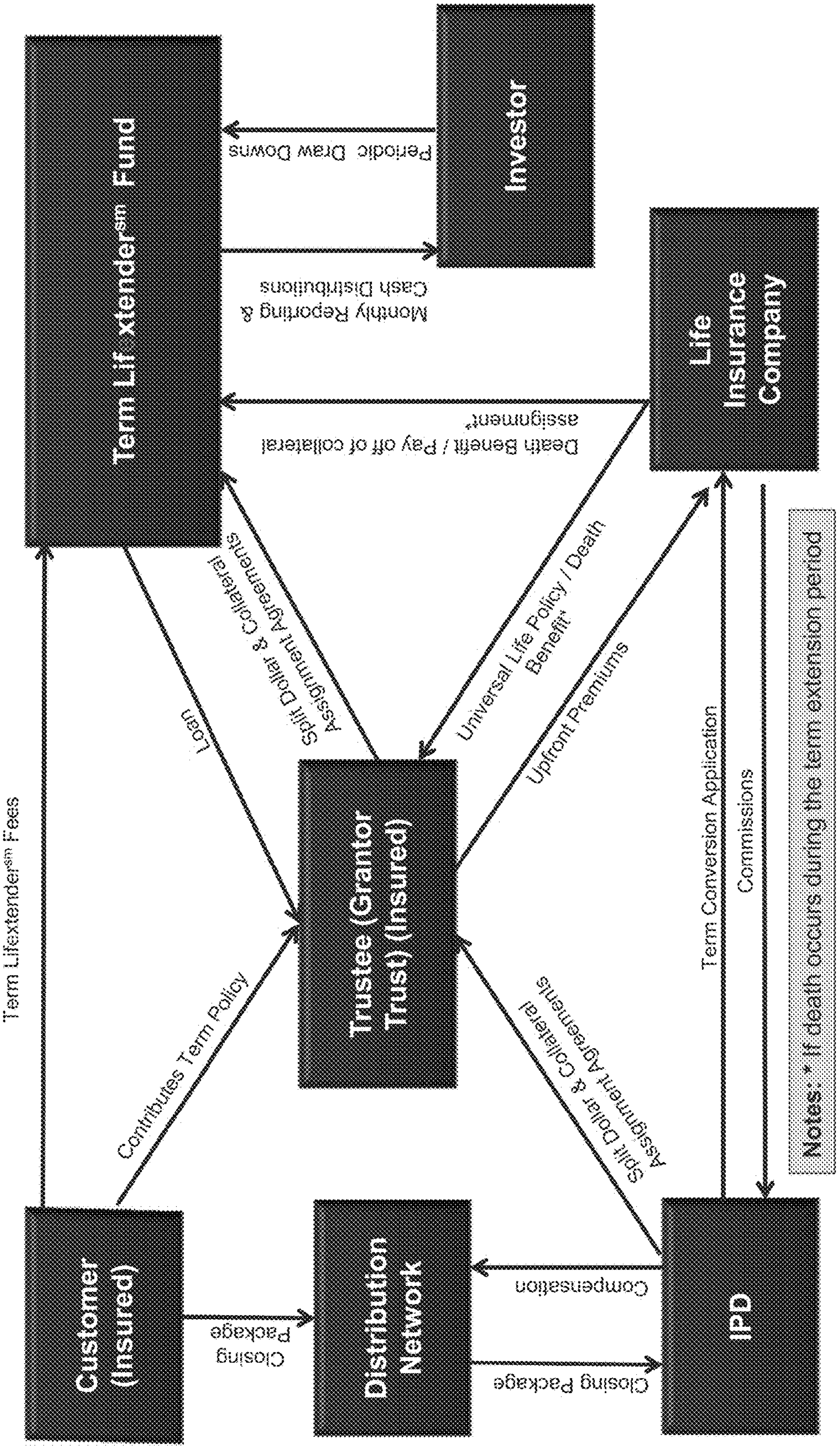

SYSTEMS AND METHODS FOR AUTOMATED MATCHING AND CONVERSION OF TERM LIFE INSURANCE POLICIES

CROSS-REFERENCE TO RELATED APPLICATIONS

This application is a continuation of application Ser. No. 14/476,219, filed Sep. 3, 2014, which claims priority under 35 U.S.C. 119(e) to U.S. Provisional Patent Application No. 61/873,170, filed Sep. 3, 2013, entitled "Systems and Methods for Extending Life Insurance Coverage for Consumers Own Convertible Term Life Insurance Policies." The entire contents of the above-referenced applications are incorporated herein by reference.

INTRODUCTION

The present systems and methods relate generally to computer-implemented insurance products, and more particularly to computer systems and methods for enabling calculation and optimization of life insurance coverage for consumers that own convertible term life insurance policies.

Generally, the present disclosure relates to a new product that allows insureds, preferably age sixty and over, who own convertible term life insurance, the ability to continue their insurance coverage for an additional period of 5-10 years (or longer, depending on the given embodiment).

An exemplary embodiment described herein comprises an insurance product allow the above-described class of insureds to accomplish this extension at significantly less cost than currently available traditional options. For ease of reference, certain examples of the insurance product described herein are referred to as "Term Lifextender" or "TLE", for ease of reference only. These terms are not intended to limit the scope of the description or of the claims, but are used solely to provide a clear description of certain exemplary embodiments. Likewise, other terms and abbreviations (such as "TLF") are used solely to provide clarity and specific examples, and are not intended to limit the description or the claims in any manner.

Exemplary embodiments may comprise systems and methods which generally relate to existing options available for a consumer to pay for the conversion of term life insurance into flexible premium adjustable life insurance (aka Universal Life). Actuarial principals, underwriting and life policy cost structures are then applied to create and provide a new product.

Many consumers over the age of sixty, for example, who have purchased term life insurance earlier in life to meet various insurance needs find themselves in need of retaining that life insurance for a longer period of time or, in some cases, for life.

The majority of these term life insurance policies offer a right to convert to a permanent life insurance policy at the same underwriting (health) class as the original term insurance term policy without having to re-qualify (undergo new medical underwriting).

However, the premium cost of the conversion policy is often high and, consequently, not affordable. According to LIMRA (Life Insurance Marketing and Research Association), approximately 1% of term life insurance policies issued in the United States are actually converted to permanent insurance.

Although a consumer has the option of buying new term coverage, this requires new medical underwriting. If the consumer's health has declined, the premium for the new term policy may not be affordable.

For insureds whose health has declined and who wish to retain their insurance coverage, the systems and methods described herein provide two options to extend insurance coverage for an additional period of time (usually 5-10 years) at a cost substantially lower than the options currently available.

An exemplary aspect comprises a computer system having one or more processors and comprising: (a) a receiving component that receives electronic data comprising application information from a customer, the application being for an insurance policy that extends the term of an existing convertible term life insurance product, issued by an insurance company, for an extended term, and is pre-paid for by a third party, the third party to be paid fees by the customer at least partly based on the customer's selection of one of a first option and a second option, the first option providing the customer with the right of first refusal to continue the insurance policy upon expiration of the extended term, and the second option providing the third party with the right of first refusal to continue the insurance policy upon expiration of the extended term; (b) an underwriting component that analyzes the application information and determines whether the customer qualifies for the insurance policy and if so, under what conditions; (c) a pricing component that, when the customer qualifies for the insurance policy, calculates the fees to be paid by the customer to the third party; and (d) a closing component that provides relevant closing documentation for the insurance policy to at least the customer, the insurance company, and the third party.

In an exemplary embodiment, one or more of the above components are application-specific processors. In another embodiment, one or more of the above components are specially-programmed general purpose processors. In another embodiment, one or more of the above components are components of software stored in a non-transitory computer readable medium.

In various exemplary embodiments: (1) if the customer selects the first option, the customer, in order to exercise the right of first refusal, is required to repay premiums paid by the third party, and ownership of the insurance policy reverts to the customer upon repayment of the premiums; (2) the third party makes periodic premium payments, and wherein repayment of the premium payments is secured by a collateral assignment recorded with the insurance company, and payment of the fees paid to the third party is collateralized by a death benefit of the insurance policy; (3) if the insured customer dies during the term extension period, the third party is repaid the amount of the premiums paid from a death benefit of the insurance policy, and the insured customer's beneficiaries receive the balance of the death benefit; (4) the insurance policy is issued through a split dollar program; (5) the insurance policy results from a conversion of the existing convertible term life insurance product; (6) ownership of the insurance policy is held by a trust; and/or (7) the customer is required to pay a higher fee for the first option than for the second option.

Further aspects, details, and embodiments will be apparent from the drawings and the description below.

BRIEF DESCRIPTION OF THE DRAWINGS

FIGS. 1 and 2 depict exemplary modeled stochastic fund cashflows (base case scenario).

FIGS. 3 and 4 depict exemplary modeled stochastic fund cashflows (100% default).

FIGS. 5 and 6 depict exemplary modeled stochastic fund cashflows (100% default, 20% mortality improvement).

FIG. 9 depicts an exemplary percentage return to fund on an individual policy dependent upon the possible outcomes.

FIG. 12 depicts data used in an exemplary term extension fee calculation.

FIG. 13 depicts a flow diagram of sales and policy creation related steps and components of an exemplary embodiment.

FIG. 14 depicts a flow diagram of closing, cash, and documentation related steps and components of an exemplary embodiment.

DESCRIPTION OF SELECT EXEMPLARY EMBODIMENTS

Figure 1:
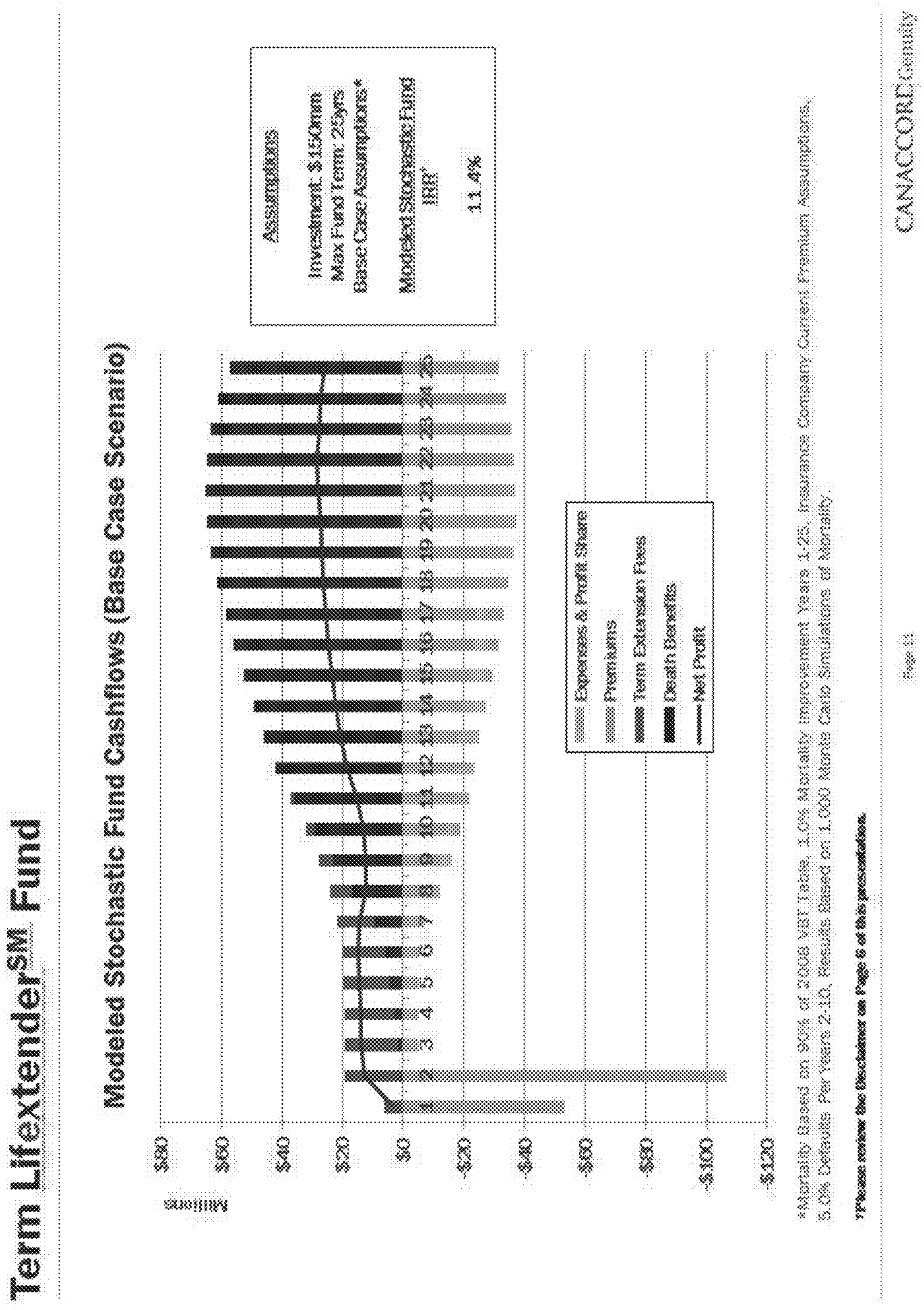

For the purpose of promoting an understanding of the principles of certain illustrative embodiments, reference will now be made to the drawings submitted herewith, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Exemplary Definitions

Term Life: A life insurance policy with a level premium for the coverage period, typically 10, 15, 20, 25, or 30 years. At the end of the level term period, premiums are no longer guaranteed.

Conversion Privilege: An option built into most individual term policies that allows the insured to convert to a permanent policy without submitting new evidence of insurability (medical exam, lab results, etc.). The converted policy is issued at the same underwriting class as the original term policy. In effect, this option protects the insured from being declined insurance or being charged a higher premium based on a change in health.

Universal Life Insurance: A flexible permanent life insurance policy that allows the policy owner to vary premiums based on the desire for cash savings buildup within the policy.

VBT: VBT is a set of valuation basic mortality tables that shows the rate of deaths occurring in a defined population during a selected time interval, or survival from birth to a given age. These tables are used by the life insurance industry to price life insurance policies.

Split Dollar Arrangement: An arrangement between two parties in which they agree to split the costs and benefits of a life insurance policy. The policy can be split in several ways—cash value, premiums, death benefit, and ownership.

Grantor Trust: A trust that allows the grantor (the individual who establishes the trust) to have control over the trust assets and receive income that is created from the trust. The grantor trust is often called a living trust or a revocable trust. A grantor trust is any trust which is taxed as if owned in whole or in part by the trust's creator.

Insurance Company Current Premium Assumptions: A projection of the non-guaranteed premiums used for universal life policies determined by two primary factors, the interest crediting rate and the cost of insurance (COI). While the interest crediting rate typically changes as market rates change, the COI, while not guaranteed, rarely changes.

Life Insurance Underwriting: The process of evaluating a potential insured's medical risk to determine their rate class. A rate class is a mortality pool containing insureds with similar risk factors, ranging from Preferred Best (Preferred Plus) for the healthiest insureds to Preferred, Standard, Table 1, 2 . . . 16, after which insureds are deemed uninsurable.

Life Settlement: The sale of an existing life insurance policy to a third party for more than its cash surrender value, but less than its net death benefit.

Mortality Experience: The actual mortality experience of a given group as compared to the expected or projected mortality experience of that group.

Mortality Improvement: A projection of the expected increase in life expectancy over a period of time.

Monte Carlo Simulations: A problem solving technique used to approximate the probability of certain outcomes by running multiple trial runs, called simulations, using random variables.

Standard Deviation: Shows how much variation or dispersion from the average exists. A low standard deviation indicates that the data points tend to be very close to the mean (also called expected value); a high standard deviation indicates that the data points are spread out over a large range of values.

Stochastic Modeling: A method of modeling in which one or more variables within the model are random. Stochastic modeling is for the purpose of estimating the probability of outcomes within a forecast to predict what conditions might be like under different situations.

Activities of Daily Living—Bathing, preparing and eating meals, moving from room to room, getting into and out of beds or chairs, dressing, using a toilet Attained Age—Insured's age at a particular time. For example, many term life insurance policies allow an insured to convert to permanent insurance without a physical examination at the insured's then attained age. Upon conversion, the premium usually rises substantially to reflect the insured's age and diminished life expectancy.

Case Management—A system of coordinating medical services to treat a patient, improve care and reduce cost. A case manager coordinates health care delivery for patients.

Casualty—Liability or loss resulting from an accident.

Convertible—Term life insurance coverage that can be converted into permanent insurance regardless of an insured's physical condition and without a medical examination. The individual cannot be denied coverage or charged an additional premium for any health problems Disease Management—A system of coordinated healthcare interventions and communications for patients with certain illnesses.

Hazard—A circumstance that increases the likelihood or probable severity of a loss. For example, the storing of explosives in a home basement is a hazard that increases the probability of an explosion Hazardous Activity—Any risky activity that might increase a person's likelihood of injury or death. Activities such as bungee jumping, auto racing, or mountain climbing are generally not covered at Standard rates in insurance policies.

Occurrence—An event that results in an insured loss. In some lines of business, such as liability, an occurrence is distinguished from accident in that the loss doesn't have to be sudden and fortuitous and can result from continuous or repeated exposure which results in bodily injury or property damage neither expected not intended by the insured.

Risk Class—Risk class, in insurance underwriting, is a grouping of insureds with a similar level of risk. Typical underwriting classifications are preferred, standard and sub-standard, smoking and nonsmoking, male and female.

Provided below (and in the attached drawings) is a description of exemplary process flow and exemplary calculations illustrating exemplary functionality of certain embodiments.

Sample Parties to a transaction:

A consumer with a convertible term life insurance policy;

Integrated Plan Designs LLC ("IPD"), an entity that administers the program on behalf of a TLE Fund ("TLF");

The TLF is an entity that provides funds to pay life insurance premiums; and

Insurance Company.

Exemplary Steps in Transaction:

1) Insurance agent identifies individuals who are potential candidates for TLE.

2) Consumer ("prospect") applies for TLE. TLE application includes copy of original term policy including original application, HIPAA form, and current medical information (medical questionnaire).

3) A. Identification of conversion rights of policy and actual product into which term policy is convertible.

B. The change in health status between the time the original policy was written and currently.

C. Combination of A+B is used to determine whether applicant is likely to qualify for TLE.

4) If answer to 3 is "yes", then process goes to underwriting. If answer is "no" case does not proceed further.

5) A. Medical Underwriting-Underwriter requests and receives the current medical records of the consumer for review to determine the current rate class for the consumer.

B. Policy Conversion Review—includes analysis of the insurance and expense factors for these products to determine the overall cost of funding the conversion policy.

6) Pricing: Input New UW class+newly converted policy to design system. The model uses actuarial assumptions for mortality, expected rate of return, issue expenses, annual maintenance fee the client will pay during the term extension period, current underwriting class and conversion policy costs to determine if the policy qualifies for TLE. If it qualifies, then the model is used to determine pricing for Option 1 and Option 2.

In one embodiment, the calculation is as follows, using actuarial present values (APV), assumed mortality, and risk adjusted interest rate.

Term Extension Fee equals (A+B−C)/D, where:

A—APV of expected policy premiums paid into the conversion policy by the TLF

B—APV of issue and maintenance expenses of the TLF

C—APV of Death Benefits to the TLF

D—Life Annuity factor to amortize these costs over the term extension period being offered.

Generally, option 1 and 2 rates will produce different risk adjusted interest rates for each option. An example calculation performed for a set of exemplary data is described below.

7) IPD issues a proposal to the prospect for the term extension, with rates for Options 1 and 2.

8) Prospect decides whether to proceed and if so, selects one of the two options.

9) If accepted, the prospect (now client) executes documents memorializing the agreement including payment of first year's fee which is held in escrow pending completion of the transaction.

10) Once signed, ownership of the policy is transferred to a Trust. The term policy is converted to the selected product, a collateral assignment is filed with the insurance company and the conversion policy premium is paid by the TLF.

11) The client is billed annually for the term extension fee.

12) If the insured dies during the term extension period, the TLF will receive a portion of the death benefit of the life insurance policy equal to the premiums paid into the conversion policy. The remainder of the death benefit is paid to the designated beneficiaries.

13) If the insured lives to the end of the term extension period, then the following two options apply:

Option 1 (client has first right of refusal)

a. Client chooses to exercise that right, the client repays premiums paid by the TLF and ownership and all rights to the policy are transferred to the client.

b. Client declines to exercise that right, the right moves to the TLF:

i. If the TLF exercises right to retain policy, then full ownership and all ownership rights are transferred to the TLF and the amount of premium paid by the fund is deemed repaid.

ii. If the TLF also does not exercise the right, the life insurance policy lapses and coverage is no longer available.

Option 2 (TLF has the first right of refusal)

a. TLF exercises that right and full ownership is moved to the TLF; the premium advanced by the TLF is deemed repaid.

b. TLF does not exercise that right, the right reverts to the client:

i. If the client exercises the right to retain policy, then the client repays all premiums paid by the TLF and ownership and all rights to the life insurance policy are transferred to the client.

ii. If the client also does not exercise the right, the life insurance policy lapses and coverage is no longer available.

Option 1 allows the client to pay a level fee for the term extension period (generally 5 to 10 years) and then at the end of the term, the client has the first right of refusal to retain the policy.

Option 2 also allows the client to pay a level fee (lower than option 1) for the term extension period. However, the consumer does not have the first right of refusal to retain the policy.

To briefly summarize: TLE allows an insured to keep his/her life insurance coverage at a cost that is more affordable than if the insured converted the policy directly with the current carrier.

A TLF will prepay the premiums required to keep a Permanent Life Insurance Policy in force for a specific term of years (typically, 5-10) (the "Term Extension Period") in exchange for an annual fee paid by the insured to TLF. The repayment of the prepaid premium to TLF is secured by a collateral assignment recorded with the issuing carrier, and the payment of the annual fee by the Insured is collateralized by the full death benefit of the Permanent Life Insurance Policy.

If the insured dies while enrolled in the TLE program, the TLF will be repaid the full amount of the split dollar loan, and the insured's beneficiaries will receive the balance of the death benefit.

Depending on the option chosen at enrollment in the TLE program, at the expiration of the Term Extension Period the loan will either be paid off and the insured's beneficiaries will receive the entire death benefit when the policy matures, or the Term Extension policy will be assigned to TLF and TLF will thereafter have the right to the entire death benefit.

Exemplary Detailed Example of a Calculation of Term Extension Fee

Definitions x=Current age of insured n=Term extension period w=Assumed terminal age DB=Death Benefit for conversion policy Prem(t)=Conversion policy premium for year t. This is determined from insurance carrier illustration software i=assumed discount interest rate Exp(t)=Assumed transaction expenses in year t Actuarial Symbols Used $$\text{Base } q(x) = \text{Base mortality rate for age } x,$$
$$\text{from 2008 } VBT \text{ mortality table}$$
$$\text{Table} = \text{table rating based on underwriting assessmemt.}$$
$$\text{Each table is equal to 25\% increase in base mortality.}$$
$$Imp = \text{Amount of assumed mortality improvement per year}$$
$$q(x+t) = \text{base } q(t+t)*(1+.25*\text{Table})*(1-Imp)^{t-1}$$
$$= \text{Assumed mortality rate for issue age } x, \text{ duration } t$$
$$p(x) = 1 - q(x)$$
$$d(x) = 1(x) * q(x)$$
$$1(x+1) = 1(x) - d(x)$$
$$\text{initial } 1(x) = 1{,}000{,}000$$
$$D(x) = lx/(1+i)^t$$
$$C(x) = d(x)/(1+i)^{t+.5}$$
$$M(x) = \sum_{t=1}^{w-x+1} C(x+t-1)$$
$$N(x) = \sum_{t=1}^{w-x+1} D(x+t-1)$$

Formulas $$\text{Term Extension Fee} = (A + B = C)/D$$
$$\text{Where: } A = \left(\sum_{t=\phi}^{w-x} Prem(t) * D(x+t-1)\right)/D(x)$$
$$B = \left(\sum_{t=1}^{w-x} \text{Exp}(t) * D(x+t-1)\right)/D(x)$$

-continued $$C = [(Prem(1) + Prem(2)) * (Mx - M(x+n)) + DB * M(x+n)]/D(x)$$
$$D = (N(x) - N(x+n))/D(x)$$

Example x=69 n=10 w=94 (25 years)

Table=3

Imp=0.01 (1% improvement)

i=0.12

Exp(1)=9%*Prem(1)

Exp(t)=1%*Prem(t) for t=2 to 25

See FIG. 12 for detailed values for A and B along with source figures for the other calculations shown below.

$$C = \frac{\left[\begin{array}{c}(148{,}000+0)*(1936420-1020002)+\\ 1{,}000{,}000*1020002\end{array}\right]}{8928571} = 129{,}430.775$$
$$D = \frac{66{,}255{,}712 - 12{,}430{,}823}{8{,}928{,}571} = 6.0283879$$
$$\text{Term Extension Fee} = \frac{188{,}483.74 - 129{,}430.775 + 22{,}822.55}{6.0283879} = \$13{,}581.68$$

Exemplary TLF

As noted above, most term life insurance policies have an option to convert to Permanent Life Insurance. Only an estimated 1% of insureds utilize this valuable option, largely due to the high cost of converting the policy.

TLF will prepay the premiums required to keep a permanent life insurance policy in force for a specific term of years (typically, 5-10) (the "Term Extension Period") in exchange for an annual fee paid by the insured to TLF. The repayment of the prepaid premium to TLF may be secured by a collateral assignment recorded with the issuing carrier, and the payment of the annual fee by the insured is collateralized by the full death benefit of the permanent life insurance policy.

If the insured dies while enrolled in the TLE program, the TLF will be repaid the full amount of the split dollar loan, and the insured's beneficiaries will receive the balance of the death benefit.

More on Exemplary TLFs

- Established to invest in fully-collateralized split dollar loans underwritten by IPD.
- Loans are collateralized by a collateral assignment filed with and recorded in the insurance carrier's records. If the insured life under a TLE policy dies during the Term Extension Period, the insurance carrier will repay the amount of the split dollar loan directly to TLF.
- Only policies issued by insurance carriers rated A- or better by A. M. Best at the time of issue will be included in the TLE program.
- Loans and collateral assignments will be held by the fund until loans are repaid or expiration of the Term Extension Period.
- Depending on the option chosen at enrollment in the TLE program, at the expiration of the Term Extension Period the loan will either be paid off and the insured's beneficiaries will receive the entire death benefit when the policy matures, or the Term Extension policy will be assigned to TLF and TLF will thereafter have the right to the entire death benefit.

Exemplary budgeted capital requirements are $50 MM in Year 1 and $100 MM in Year 2. Draws are expected to be quarterly.

Initial Size: US$150 mm (~1200 policies), min $50 mm (~400 policies)Year 1

Form: Pass Through SPV

Domicile: Ireland 110/Delaware LLC/Cayman LP

Legal Final Maturity: 25 years

Targeted Distributions: Quarterly commencing in Year 2

Drawdowns: Quarterly commencing on closing date

Targeted Base Case Returns: ~11.4%*

Standard Deviation: ~0.4%*

Collateral: Split Dollar Loans and a security interest in Universal Life Insurance Policy (Carrier rated A- or better by AM Best)

Base Management Fee: 2%

Hurdle: 8%

Performance Fee: 30%

Set Up Costs: $500,000

Placement Fees: 0-50 mm 3%, 50 mm-200 mm 2%, 1% thereafter

Assumes $150 mm min TLF Size.

The models used as the basis for the targeted returns set forth in this description are based on a number of assumptions, some of which are mentioned and some of which are not.

Exemplary Collateral Terms

Prior to the expiration of the Term Extension Period, a collateral assignment equal to the amount of the split dollar loan recorded by the insurance carrier on a universal life insurance policy insuring the life of the insured.

Post expiration of the Term Extension Period, or following an event of default by the insured, the universal life insurance policy on the life of the insured becomes an asset of the TLF.

TABLE 1

Some examples of differences between embodiments of TLE and Life Settlements

| | TLE | Life Settlements |
|---|---|---|
| Individual has the desire to KEEP their life insurance coverage at an affordable price. | YES | NO |
| Individual has the desire to monetize the value of their life insurance policy for an immediate cash payment. | NO | YES |
| Mortality assumptions based on underwriting techniques for populations, not individuals. | YES | NO |
| Large potential policy pool available as individuals currently have policies managed by life insurance agents. | YES | NO |
| Agent commissions are paid by the life insurance company. | YES | NO |
| Upfront policy costs are highly dependent on market conditions at the time. | NO | YES |

More on Underwriting

Underwriting allows insurance companies to classify risks and appropriately price insurance for each applicant. In the context of life insurance, underwriting is the process of evaluating medical and non-medical information about an individual and determining the effect these factors statistically have on life expectancy. The process of evaluation is referred to as risk classification. The initial process includes not only a current health profile, but past medical history, familial health history, the person's occupation, habits such as smoking and alcohol use, hobbies, and even driving record. The goal is to obtain a clear picture of relevant risk factors.

Risk classification has been around since at least the 1700s. By the late 1800s medical directors and actuaries began to collaborate and build mortality tables for common risk factors such as blood pressure and weight. By the early 1900s companies began to formulate ratings based on common substandard conditions.

In modern day underwriting, or risk classification, the underwriter reviews the application, medical and non-medical history, and makes a determination as to whether issue an insurance policy at standard or preferred rates, or with a rating, or to make a complete rejection.

Standard rates are given to individuals who pose an average risk and have a normal life expectancy.

Preferred rates are offered to individuals whose sound health and low risk hobbies pose less than the average risk for the insurance company and gives them a greater than normal life expectancy.

Rated life insurance policies are issued when the underwriter observes that the applicant's health record demonstrates increased risk (such as having diabetes mellitus or having sustained a heart attack), which reduces the person's life expectancy. The premiums are higher for rated policies.

Finally, if the person has a serious illness, or a terminal illness, underwriting rules can require the policy to be rejected altogether. By using this approach, across hundreds of thousands of lives, the life insurance industry has been able to establish ranges of expected survival time for individuals who fall into their different table categories. This "law of large numbers" approach enables the insurance industry to predict future mortality or losses and is the basis for mortality tables that display the incidence of death among certain age groups of similar risks. If a person is reassessed at a later date, the underwriter determines whether there is sufficient data to support that individual remaining in the same risk pool or being placed in a different risk pool category.

The underwriter's goal is to get as true a picture of the applicant's lifestyle as possible. For example, the underwriter may examine any factors (such as occupation, dangerous hobbies, etc.) that could make the applicant more likely to die before his or her natural life expectancy. While an underwriter cannot accurately predict how long any one individual will live, by grouping together like individuals with similar risk factors, overall life expectancy can be reliably determined.

At the time of initial underwriting, one of the underwriter's primary functions is to protect the insurance company as much as possible against adverse selection (very poor risks) and those parties who may have fraudulent intent (anti-selection against the company.)

Adverse selection is said to exist when a risk (an individual) or group of risks that are insured is more likely than the average corresponding group to experience a loss. This usually occurs when the individual deliberately hides certain pertinent information from the insurer. This information may be of critical nature in underwriting the risk profile and determining the correct rate class or premium. For example, in a randomly-selected group of 1,000 25-year-old individuals, only two might be expected to die in any given year. However, the bulk of healthy 25-year-old young adults do not typically regard the need to buy life insurance. It is more likely that 25-year-olds who are ill or may be employed in dangerous occupations will want to purchase insurance. In this setting, the underwriter's responsibility is to ensure that an inordinate number of these poorer-than-average risks aren't accepted or the insurance company will lose money.

A simplified example of underwriting class selection is seen below in Table 2:

TABLE 2

| Underwriting Criteria | Best Class | Preferred | Standard Plus/Standard |
|---|---|---|---|
| Health & Medical History and Physical/Mental Impairments | No health impairments are allowed. No personal history of cardiovascular disease or diabetes. | No health impairments are allowed. No personal history of cardiovascular disease or diabetes. | Some health impairments are allowed. Can have personal history of certain cardiovascular diseases or diabetes. |
| Blood Pressure | No current or past history of treatmentof hypertension. Current and average readings in the past two years hot exceeding 140/85. | Currently well controlled with current and average readings in the past two years not exceeding 150/90 | Currently well controlled with current and average readings in the past two years not exceeding: 150/90 - age 45 and younger, 155/95 - ages 45-60, 159/95 - ages 61 and over. |
| Family Medical History | No cardiovascular disease or cancer in either parent or any siblings before age 60. | No cardiovascular death of either parent before age 60. | Cardiovascular death of no more than one parent before age 60. |
| Personal Driving History | Cannot qualify if 2 or more moving violations in last 3 years, or if any DUI in last 60 months. | Not available to applicant if 2 or more moving violations in the last 3 years except with flat extra, or if any DUI in last 60 months. | No more than 2 moving violations in the past 3 years. No record of DUI or reckless driving in the past 2 years. |
| Use of Tobacco or Tobacco Products | No tobacco use in the past 36 months. | No tobacco use in the last 12 months. | No tobacco use in the last 12 months. |
| History of Cancer | Insurance company dependent - only available on certain types of skin cancer. | Insurance company dependent - only available on certain types of skin cancer. | Available depending on type and duration of cancer. |
| Cholesterol Readings | Levels may not exceed 240. | Levels may not exceed 250. | Levels may not exceed 280. |
| CHOL/HDL Ratio | May not exceed 5.0. | May not exceed 6.5. | May not exceed 7.5. |
| Substance or Alcohol Abuse | No history of substance or alcohol abuse. | No abuse in past 10 years. | No abuse in past 7 years. |
| Aviation | Commercial airline pilots accepted. Private pilots - may qualify with aviation exclusion. | Commercial airline pilots accepted. Private pilots- flat extra may apply depending on experience. | Commercial airline pilots accepted. Private pilots- flat extra may apply depending on experience. |
| Hazardous Activities (i.e. Skydiving, Hang gliding, Rock climbing, Scuba diving etc) | Available only if no flat extra premium would be required. | Available; however, may have flat extra. | Available; however, may have flat extra. |
| Residency-Citizenship | Must be a U.S. resident for past 3 years and either a U.S. citizen or have permanent Visa or Green card. | Must be a U.S. resident for past 3 years and either a U.S. citizen or have permanent Visa or Green card. | Must be a U.S. resident for past 2 years and either a U.S. citizen or have permanent Visa or Green card. |

Exemplary components of TLE Underwriting

Much of the initial risk assessment process in the life insurance industry and the senior settlement industry is similar. The evaluator looks for anything that promotes a longer life or that imparts a longevity risk. However, what that information means to the evaluator and what is done with the data is often different.

Risk assessment in the senior settlement industry is different from the process used in the life insurance industry. Much of this is related to the relatively smaller pool of individuals being considered/underwritten. The Law of Large Numbers generally does not hold, thus the impact of any single life is far greater. In the senior settlement industry, the risk is that the insured may live too long. Attention must be given to advances in medical science that may lessen the impact of any health conditions upon longevity. In addition, policy evaluators may consider an individual's financial status and access to high quality health and supportive care services.

In the life insurance industry, the risk is that the insured may die too soon. Advances in health care work in this industry's favor. In primary medical underwriting, longevity risk is automatically factored into the process of underwriting and individuals can be turned down if they present too great a risk. On the other hand, in the senior settlement industry, investors frequently want to identify high health risk individuals and are at risk of overemphasizing it.

Even more importantly, rather than respecting the concept of risk pools and ranges of possible outcomes, the senior settlement industry is driven by the pursuit of specific times of mortality, and bases investment strategy upon "median" life expectancy (LE).

The use of a median LE is problematic for a number of reasons. The first is a statistical issue. Mortality/survival curves are typically not smooth and do not readily follow parametric statistic patterns. Events are not as likely to occur on either side of the median or mean.

The second is that the risk modifying factors previously noted are used to try to predict shifts in individual life expectancy by a specific number of years. Since the number of individuals demonstrating any single combination of health impairments is small, LE underwriters are consistently trying to apply large number science to single individual cases.

Third, in senior settlement underwriting there is always the risk that debits associated with medical conditions which are not mutually exclusive (for instance hypertension and coronary artery disease) are "stacked" upon one another and that the resultant LE is erroneously short.

Fourth, while there is a wealth of experiential data for setting mortality rates in the life insurance industry, this is not the case for senior settlements. In the senior settlement industry, the profiles examined are of elderly individuals who may have significant conditions or multiple conditions that make them different from their healthier cohorts. One would think this would invariably lead to a shortened life expectancy. However, there is a limited amount of data regarding how specific diseases or groups of diseases affect longevity in the older senior groups.

Furthermore, the more healthful lifestyles of many seniors, access to new medications and improved medical technology extends life, but in an unpredictable manner (some of the new interventions have not existed long enough to generate meaningful data). Thus, relying upon traditional charts and tables for baselines and "established" debits and credits for many individuals may not be appropriate. For medically complex cases, in order to "be in the ball park," the underwriting team may follow a clinical/epidemiological model in which the most current published medical data was consistently being assessed and incorporated into their model. Even under the best of circumstances, and utilizing the highest degree of medical scrutiny, this system falls back on trying to apply group data to single cases.

In contrast, exemplary embodiments of the TLE approach to underwriting may comprise a novel extension of the traditional underwriting used by the insurance industry. As a result, the specific classification of each individual is methodologically similar to those used in major life insurance companies today. As opposed to focusing on determination of a specific life expectancy, an "underwriting class" may be established, which is used to price the cost of the term extension fee. Pricing is closely linked to the underwriting class and is modulated by the specific features of each individual convertible term policy.

In this exemplary TLE system, individual medical diagnoses are not as important as combinations of factors which can produce a change in risk pool/table status. The TLE system may be driven by the need to derive the current underwriting class, and not to determine a single LE. The TLE system advantageously segregates the medical analysis from the financial analysis.

A medical quality assurance process may include two separate professionals reviewing the medical data so that purported medical conditions may be supported or refuted. The information required may include the original insurance application/determination, a new application and medical questionnaire, a current prescription medication list, and medical records/lab work from the past 12 months.

Unlike the senior settlement industry, the TLE system determines whether there is sufficient evidence to induce a table shift, and does not attempt to second guess the insurance industry's life expectancy predictions. The goal is not to predict how many years a person will live, but to determine whether the person would qualify for the same table rating that was issued in the past.

Simply put, in an exemplary embodiment the TLE process seeks to compare the current class and the original issue class. In order for an applicant to become a candidate for the program, the comparison of the old and new findings needs to indicate that a table shift has occurred.

Unlike with the senior settlement industry, arbitrary debiting or crediting is replaced by a system identifying a reliable change from an established baseline. The TLE approach has the ability to apply large number science and to amass larger groups of "like" individuals. The model also assumes a baseline table equivalent to 90% of 2008 VBT (see Table 2 above). The 0.9 figure is based upon the actual experience of over 3 million lives (underwritten as term insurance).

Exemplary embodiments of the TLE underwriting process, combined with an appropriate pricing model, provide an additional layer of investor protection. The underwriter may utilize the provided data and establish an underwriting class. While the initial class determination may have been based upon the initial application, medical records (physician & hospital records), a physician exam, and blood/urine samples, in an exemplary embodiment the TLE underwriting is based upon the original records, a new application, and current existing physician/hospital records.

Since an exam does not take place and new lab measures may not be available, the TLE approach leads to a more conservative assumption of health status. Furthermore, once a class has been determined, the TLE protocol may require a "second look underwriting."

In the "second look underwriting," the TLE process may apply a second layer of scrutiny to further mitigate underwriting risk. This is important because the class determines the number of table arbitrages. In this step, the TLE system seeks to understand "how and why" the insured has been placed in the specific class. Special attention may be paid to conditions which can readily change (e.g., obesity) versus ones which are more fixed in nature (e.g., a documented surgical removal of an organ) versus ones which may progress (e.g., diabetes with evidence of disease complications). The system may seek to distinguish between higher and lower risk candidates even within the same class. Adjustments to these subtle distinctions may be made in order to protect the investor.

Medical Underwriting QA

Quality assurance is a fundamental component of investor protection. Although a new physical exam may not be performed in most cases, an exemplary embodiment of the TLE system maintains high quality standards which enable the underwriting component to underwrite cases with predictable results. Exemplary QA processes may include data verification, high quality medical data analysis, expert application of data to insurance tables, and a second medical analysis to determine whether there are clinical factors which potentially influence final table selection. High quality medical analysis may require a current and valid medical data set. An exemplary QA process seeks to verify that the records undergoing review accurately reflect an individual's health status and that all important diagnostic information is included.

Corporate Compliance

Exemplary embodiments follow HIPAA guidelines. There preferably is secure electronic transmission of data between the TLE system and clients. The medical analysis preferably is done independently of financial data. There preferably is restricted access to the data.

Concept of Medical Volatility

As noted above, not all medical conditions are "static." For the medical reviewer component, the following may be considered:

1. What is the potential for change in the identified medical conditions?

2. Could the potential for change or acquisition of new data have a meaningful impact upon medical management and the individual's longevity?

3. Is the volatility identified unidirectional versus bidirectional?

4. Why might circumstances improve?

5. Why might circumstances worsen?

6. Is there synergy or competition between the dynamic health and social conditions?

For each case under review, the system may indicate which of the following apply:

Unimpaired

Medically impaired, not meaningfully different from previous underwriting

Medically impaired, key conditions likely to improve

Medically impaired, key conditions likely to behave as expected

Medically impaired, key conditions likely to worsen at accelerated pace

Medically impaired, key conditions equally likely to improve or deteriorate

This final layer of scrutiny not only enhances the precision of an exemplary underwriting process, it also confers an additional element of investor protection.

Exemplary Underwriting Process

Overview

Evaluation of an individual's medical and non-medical information to assess the effect these factors have upon current underwriting class.

Determination if the identified impairments constitute a meaningful change in health risk status from prior underwriting.

Determination if the change in status constitutes a significant enough decline (change in underwriting class) to create the potential for meaningful arbitrage.

Prerequisites for Underwriting Review

Copy of existing term policy including original application and term conversion language New TLE application including current medical questionnaire Key Questions for Underwriting Team Has there been a meaningful decline in health?

Step-Wise Approach—Pre-Qualification

Candidate healthy→process stops

Previously impaired but no decline in health status→process stops

Decline in health status→proceed to further evaluation and determination of whether candidate will qualify for TLE Step-Wise Approach—Coarse Filter Proceed to new underwriting Obtain new medical data/APS Obtain prescription records Determine current underwriting class Step-Wise Approach—Fine Filter What is the potential for change in the identified medical conditions?

Could the potential for change or acquisition of new data have a meaningful impact upon medical management and the individual's classification?

Might circumstances improve?→shift to lower risk class.

Might circumstances worsen?→shift to higher risk class.

Estimation of "volatility"→quantification of above results.

Distribution

Figure 8:
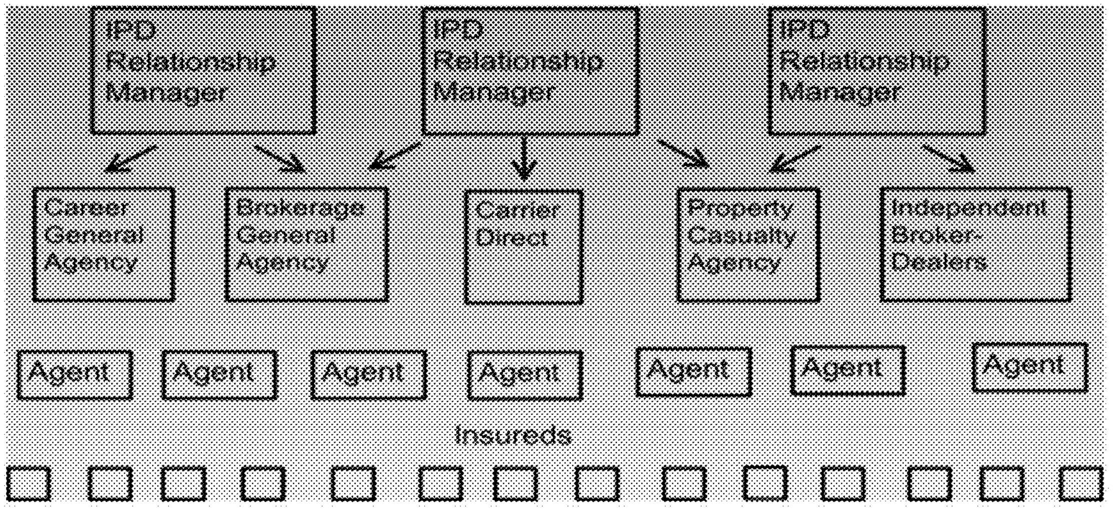
FIG. 8 depicts an exemplary distribution system.

An exemplary embodiment utilizes a unique distribution system to integrate with the existing national life insurance distribution system to offer TLE as a new sales opportunity and revenue source for agents and general agents. See FIG. 8.

Exemplary Case Study

Goal: to extend life insurance coverage beyond expiration of current term insurance.

Current Situation:

Male—age 69

$1,000,000 10 year term policy, near expiration

Original policy issued Super Preferred (excellent health)

Current Health Table 3 (minor health problems)

Current Options: Insured's Perspective (1) Convert to permanent universal life at original class: $32,800 annually—no underwriting (2) Buy new 10 Year Term: $20,500 annually—full underwriting (no conversion right at end of term).

New Options: 10 year TLE (1) Option 1: $15,400 annually, insured has right to retain policy at the end of the term extension period.

(2) Option 2: $10,000 annually, insured has no right to retain the policy.

Agent's Perspective

Agents have a new option to offer clients affordable life insurance.

New source of revenue: $26,000 commission, regardless of option chosen.

Investor's Perspective

FIG. 9 depicts an exemplary percentage return to fund (TLF) on an individual policy dependent upon the possible outcomes.

Conclusion

TLE offers 60-75 year olds (for example) the ability to keep their valuable life insurance at an affordable price.

TLE is scalable. More than 18,000,000 people will turn 65 over the next five years. 8,000 policies builds a billion dollar TLF portfolio over five years. There are approximately 400,000 licensed agents and general agents in the United States.

TLE targets an attractive, predictable return on investment—modeled average ~11+% IRR with a ~0.4% standard deviation at a $150 mm fund size.

Modeled Stochastic Base Case Results of a hypothetical Fund Structure

Exemplary Assumptions $150 Million Invested Capital

Mortality Based on 90% of 2008 VBT Table*

Underlying Portfolio—25 Year Legal Final 1.0% Mortality Improvement Years 1-25**

Insurance Company Current Premium Assumptions 5.0% Defaults Per Years 2-10

Results Based on 1,000 Monte Carlo Simulations of Mortality

*High Face Amount Mortality Study (Society of Actuaries April 2012).

Fully underwritten term life insurance policies (policies $1,000,000 and over)

| | |
|---|---|
| Total lives: | 3 million |
| Face amount: | 4.3 trillion |
| Average policy size: | 1.43 million |
| Mortality Experience: | 91% |

** Towers Watson—Global Mortality Improvement Experience and Projection Techniques Study—June 2011

| | |
|---|---|
| Average IRR | 11.4% |
| Standard Deviation | 0.4% |
| Maximum IRR | 12.8% |
| Minimum IRR | 10.1% |

All returns are internal rates of return on pre-tax cash flow to the investor. No cost of capital is assumed.

FIGS. 1 and 2 depict exemplary modeled stochastic fund cashflows (base case scenario).

Figure 3:
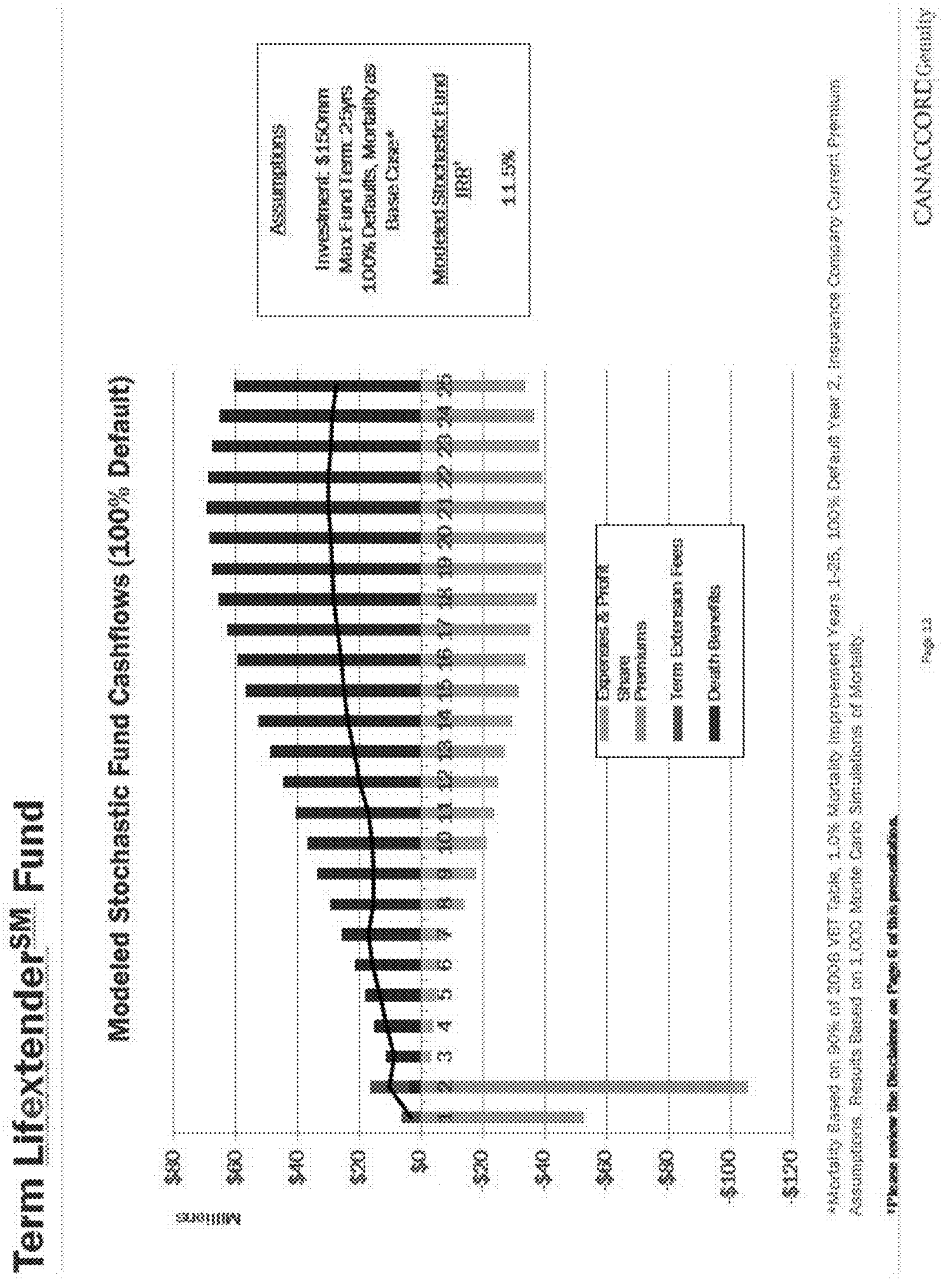

FIGS. 3 and 4 depict exemplary modeled stochastic fund cashflows (100% default).

FIGS. 5 and 6 depict exemplary modeled stochastic fund cashflows (100% default, mortality improvement).

Figure 7:
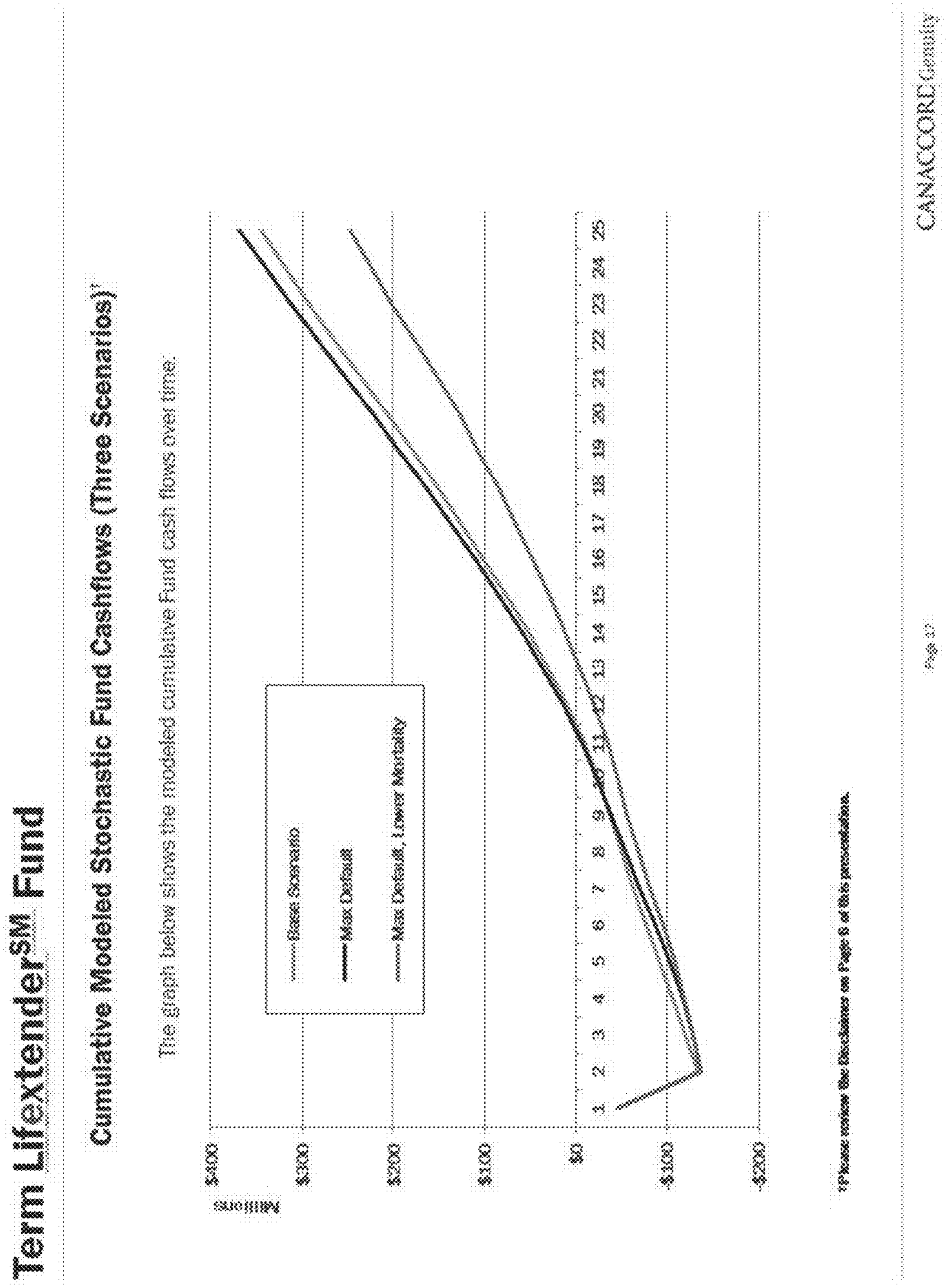
FIG. 7 depicts exemplary cumulative modeled stochastic fund cashflows (three scenarios).

FIG. 7 depicts exemplary cumulative modeled stochastic fund cashflows (three scenarios).

TABLE 3

| $1,000,000-$500,000,000 INVESTED CAPITAL | | | | | | |
|---|---|---|---|---|---|---|
| | No. of Scenarios | | | | | |
| | 1000 | 1000 | 1000 | 1000 | 1000 | 1000 |
| Total Capital | $1,000,000 | $25,000,000 | $50,000,000 | $150,000,000 | $250,000,000 | $500,000,000 |
| Approx. # of Cases | 8 | 185 | 370 | 1,110 | 1,850 | 3,700 |
| Average | −2.5% | 10.9% | 11.3% | 11.4% | 11.5% | 11.5% |
| Std. Dev. | 7.9% | 1.6% | 0.7% | 0.4% | 0.3% | 0.2% |
| Max | 8.9% | 14.4% | 13.5% | 12.8% | 12.5% | 12.4% |
| Min | −20.0% | 2.7% | 8.2% | 10.1% | 10.4% | 10.7% |

Maximum negative return was set at −20% for modeling purposes.

Stress Tests

Analysis of Projected Results—

Assumption Sensitivity Tests

TABLE 4

| 10% PREMIUM INCREASE-ALL YEARS | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 10.9% | 0.4% | 24 | $1.5 | 10 | $6.3 |

TABLE 5

| 100% DEFAULT IN YEAR 2 | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 11.5% | 0.6% | 3 | $0.6 | 2 | $1.0 |

TABLE 6

| 20% MORTALITY IMPROVEMENT (72% 2008 VBT) | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 9.2% | 0.5% | 135 | $2.0 | 10 | $9.9 |

TABLE 7

| 2% p.a. MORTALITY IMPROVEMENT | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 10.1% | 0.5% | 38 | $1.3 | 9 | $7.6 |

TABLE 8

| 100% DEFAULT AND 20% MORTALITY IMPROVEMENT | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 8.7% | 0.6% | 70 | $1.6 | 8 | $4.8 |

At What Point is IRR Zero?

TABLE 9

| BASE CASE WITH 45% MORTALITY (45% 2008 VBT) | | | | | | |
|---|---|---|---|---|---|---|
| Capital (mil) | Avg. IRR | Standard Dev. | Scenarios with a Loss | Avg. Loss (mil) | Avg. Loss Year | Maximum Loss (mil) |
| $150 | 5.1% | 1.3% | 1000 | $20.0 | 9 | $64.2 |

TABLE 10

| WITH 100% RESERVE - ALL YEARS | | | |
|---|---|---|---|
| Adjusted IRR | Scenarios with a Loss | Avg. Loss (mil) | Maximum Loss (mil) |
| 8.7% | 70 | $1.6 | $4.8 |

Mortality Examples

TABLE 11

| Life Expectancy (Age) | | | | |
|---|---|---|---|---|
| | AGE | BASE (90% 2008 VBT) | STRESSED (72% 2008 VBT) | EXTREME 45% 2008 VBT |
| | 60 | | | |
| Issued Class | Super Preferred | 95.5 | 102.7 | 105.9 |
| Arbitrage | 5 Tables | 84.0 | 86.7 | 89.8 |
| | 66 | | | |
| Issued Class | Preferred | 91.7 | 95.4 | 99.1 |
| Arbitrage | 4 Tables | 85.1 | 87.2 | 90.3 |
| | 68 | | | |
| Issued Class | Preferred | 91.9 | 95.3 | 99.1 |
| Arbitrage | 4 Tables | 85.6 | 87.4 | 90.6 |
| | 69 | | | |
| Issued Class | Super Preferred | 95.8 | 100.9 | 105.3 |
| Arbitrage | 5 Tables | 85.8 | 87.6 | 90.7 |

Exemplary Distribution Process (Sales Work Flow)

Goal: To efficiently and profitably market and sell TLE through a dedicated independent distribution network. The distribution system preferably is designed to avoid conflicts of interest and to ensure that agents and insureds understand and purchase TLE policies only when appropriate.

Distributors may be independent businesses responsible for building their own structures. Distributors may have broad latitude in the structure and operation of their business within the standards and guidelines set by IPD or an equivalent entity.

IPD may establish relationships with independent distributors who meet the following criteria:

1. Are not directly licensed distributors or general agents for life insurance companies.

2. Intend to market to existing distribution channels within the life insurance industry (i.e., MGAs, GAs, IBDs, RIAs, P&C Agencies, life insurance agents etc.)

3. Agree to sign and function under the terms of an IPD Distribution Agreement.

4. IPD will educate, train, and supervise the entities and their agents about TLE—product, target demographic, sales process.

IPD's distributors may be responsible for the following:

1. Serve as the intermediary between existing distribution channels and IPD.

2. Establish relationships with entities within the life insurance industry distribution system.

3. Educate, train, and supervise the entities and their agents about TLE product, target demographic, sales process.

4. Oversee the sales process—applications, proposal and closing, as outlined in the job description.

Exemplary IPD Distributor Job Description

1. Prospect—sign agreements

Entities—MGA, Captive GA, Carrier Direct, P&C, Life Settlement, IBD/RIA

Agents

2. Train

Entities

Agents

3. Sales

Applications—review for completeness and accuracy, and return to IPD

Proposal—forward to entity/agent, review for completeness, and return to IPD

Closing—forward to entity/agent, review for completeness, and return to IPD

Exemplary Split Dollar Plan Design

Step 1: Qualify Prospect—goal is to determine whether prospect will qualify for TLE A. Case set-up—data entry.

B. Medical Evaluation—establish preliminary underwriting class; establish preliminary impairment level—if no impairment, case does not qualify.

C. Product Evaluation.

D. System determines whether case goes to underwriting.

Step 2: Underwriting—goal is to provide the criteria necessary to price TLE for the individual.

A. Primary Medical Underwriting—determine underwriting class.

B. Detailed Product Analysis—optimize policy design to identify appropriate TLE product; reverse policy analysis software.

Step 3: Pricing—goal is to determine whether an offer is appropriate, and if so, actual pricing.

A. Secondary Medical Underwriting—validate underwriting class, perform health analysis and medical quality assurance.

B. TLE pricing—determine Options 1 & 2 pricing

Step 4: Proposal Package—goal is to create and send to distributor a a complete set of documentation needed to implement TLE for the agent/customer.

A. create closing package.

Split Dollar Plan Implementation—Closing

Step 1: Closing Package—if customer elects to proceed with TLE, goal is to receive from the customer/agent/distributor a complete set of documentation needed to implement TLE.

A. Review the completed documentation for delivery to IPD.

Step 2: Closing Process—goal is for IPD to process all documentation and facilitate all steps necessary to implement TLE:

A. Change of Ownership & Beneficiary forms (customer contributes term policy)

B. Term Conversion Application (with term conversion premium if required).

C. Split Dollar & Collateral Assignment Agreements.

D. Loan documents.

E. Universal Life Policy review

F. Initiate loan from TLF to Trustee

G. Send term conversion premium to Life Insurance Company (if not sent in step B)

H. Forward Universal Life Policy to Trustee and receive delivery receipt back from Trustee I. TLE fee forwarded to TLF J. Insurance Company commissions received by IPD K. Compensation paid to Distributor Step 3: Final Verification—goal is to verify that entire package has been processed and recorded properly. Case then delivered to Fund Administrator for monthly reporting and cash distribution, periodic draw downs, and receipt of death benefit as payoff and release of collateral assignment.

Further details of sales work flow and closing are depicted in FIGS. 13 and 14, and provided in the description below. For clarity, implementing computer systems and components are not shown, but their presence and usage will be apparent to those skilled in the art.

Referring first to FIG. 13 (Sales Work Flow):

Step 1: Distribution/Pre-Contract—goal is to locate and process life insurance policies for inclusion in a split-dollar TLE program.

An entity representing an off-shore Fund or equivalent entity may contract with a U.S. entity ("TLE Agent") set up for the purpose of coordinating the sourcing of TLE policies.

The TLE Agent may enter into a relationship with Integrated Plan Design LLC ("IPD") or equivalent entity to oversee and manage sourcing of TLE policies via independent distributors (each, a "Distributor"). The Distributors may enter into producer agreements with independent insurance Agents/GAs (each, an "Agent").

Agents may locate new or existing clients (each, a "Customer") in need of a TLE product. The Agents may assist Customers with completion and execution of a TLE application (an "Application"), which may then be submitted to a Distributor. In an embodiment, this submission is made electronically, between a Customer computer/server and an Agent or Distributor computer/server.

As part of the application process, the Customer may select either Option 1 (the Customer pays a higher split-dollar fee and has a right to keep the policy at the end of the term) or Option 2 (Customer pays a lower split-dollar fee and the Fund has the right to keep the policy at the end of the term).

The Distributor may review the Application for completeness and appropriateness for the TLE program. If the Distributor determines that the Application is appropriate for the TLE program, the Application may be submitted to IPD for review and pricing. In an embodiment, this submission is made electronically.

If IPD determines that the Application is appropriate for the TLE program, it may price the TLE product for the Customer and extend the offer based on the option chosen by the Customer.

Upon acceptance of the offer by the Customer, IPD may prepare a TLE closing package. A Trustee may be engaged to serve as the trustee of a trust that will own the TLE policy.

Referring to FIG. 14:

Step 2: Closing Package—goal is to give the Customer and Agent a complete set of all documents (closing package) needed to participate in the TLE program.

The closing package may include grantor trust formation documents, term conversion application, term conversion illustration, change of ownership/beneficiary form, collateral assignment, split dollar fee agreement, loan documents and receipt for payment of first year's split-dollar service fee.

The closing package may then go to a Distributor, then to the Customer for completion with the assistance of the Agent. In an embodiment, the closing package is transmitted electronically.

Once completed, the closing package, along with the first year's split-dollar fee, will be returned to the Distributor and on to IPD.

Step 3: Closing Process—goal is to process all paperwork necessary to enroll a Customer in the TLE program.

A Trustee may sign the trust agreement, the split-dollar financing agreement, Loan documents (if not included in Split Dollar Agreement) and collateral assignment. Change of ownership/beneficiary forms, conversion application, conversion illustration, and any other required documents may be submitted to a converting/issuing carrier (Life Insurance Company). Upon conversion, the TLE policy may be sent by the carrier to IPD. In an embodiment, the documents are created and transmitted electronically.

The TLE Agent may sign the collateral assignment. IPD may deliver the TLE policy to the Trustee and get a signed delivery receipt for the TLE policy from the Trustee.

The Fund may execute the split dollar financing agreement between the Fund and the trust. The Fund may issue a check or make an electronic payment to the carrier for the funds to cover the conversion of the policy into a universal life policy, and the amount of premium to keep the policy in force for the term of the extension period.

IPD may submit a conversion and premium check or make an electronic payment, along with the collateral assignment to the issuing carrier for processing. This may begin a "Free Look" period. The Fund may cut a separate check or make an electronic payment to IPD for its fee in processing the transaction.

After recordation, the insurance carrier may send confirmation that the collateral assignment has been filed and accepted.

Step 4: Final Verification—goal is to verify that the entire the closing package has been processed and properly recorded.

A fully executed document package may be sent to each of the involved entities (insured, Distributor, Trustee, Fund (Fund administrator).

After appropriate seasoning, the loan and all other TLE program documents may be sold and assigned by the TLE Agent to the Fund.

Exemplary Alternative Split Dollar Plan (TLE) Implementation

Figure 10:
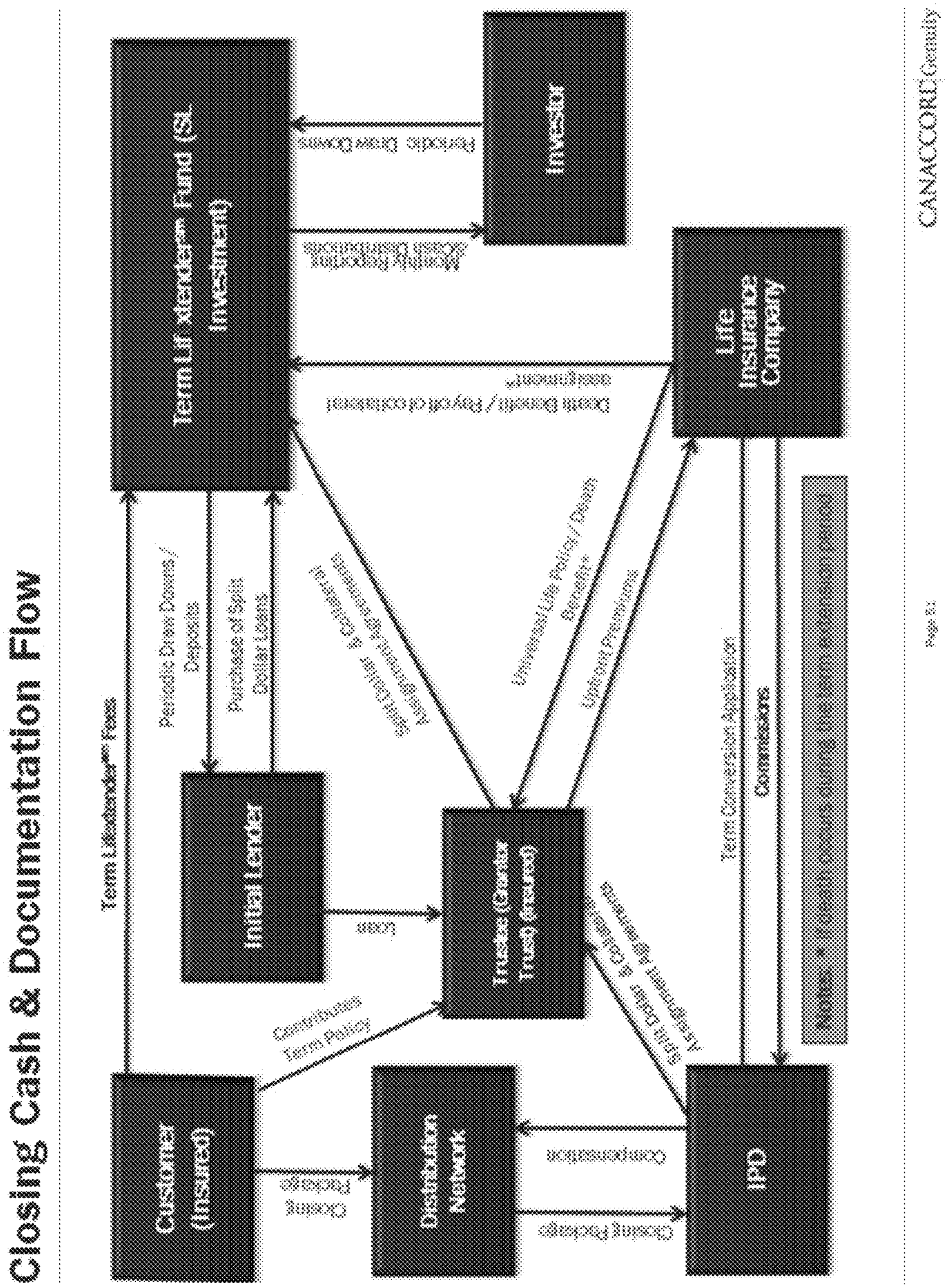
FIG. 10 depicts a flow diagram of closing, cash, and documentation related steps and components of an exemplary embodiment.

FIG. 10 provides a flow diagram of steps and components of an exemplary embodiment. For clarity, implementing computer systems and components are not shown, but their presence and usage will be apparent to those skilled in the art.

Step 1: Distribution/Pre-Contract—goal is to locate and process life insurance policies for inclusion in the split-dollar TLE program.

An entity representing the off-shore fund (the "TLF") may contract with a U.S. entity (the "TLE Agent") set up for the purpose of coordinating the sourcing of TLE policies.

The TLE Agent may enter into a relationship with an entity (shown here as IPD) set up to oversee and manage the sourcing of TLE policies via independent distributors ("Distribution Network").

The distributors may enter into producer agreements with independent insurance producers (each, a "Producer"). Producers will locate new or existing clients (each, a "Customer") in need of the TLE product.

The Producers will assist Clients with completion and execution of the TLE application (an "Application"), which will then be submitted to a Distributor.

As part of the application process, the Client will select whether they want Option 1 (the Client pays higher split-dollar fee and has right to keep policy at the end of the term) or Option 2 (Client pays lower split-dollar fee and the TLF has the right to keep the policy at the end of the term).

The Distributor will review the Application for completeness and appropriateness for the TLE program.

If the Distributor determines the Application is appropriate for the TLE program, it will be submitted to IPD for review and pricing.

If IPD determines the Application is appropriate for the TLE program, it will price the TLE product for the Client and extend the offer based on the option chosen by the Client.

Upon acceptance of the offer, IPD will prepare the TLE closing package.

A trustee (the "Trustee") will be engaged to serve as the trustee of the trusts that will own the TLE policies.

Step 2: Closing Package—goal is to give the insured and Producer a complete set of all documents needed to participate in the TLE program.

Prepare the necessary documentation for the Client to enroll in the TLE program.

The closing package will include grantor trust (e.g., Georgia) formation documents, term conversion application, term conversion illustration, change of ownership/beneficiary form, collateral assignment, split dollar fee agreement, Loan documents (if not included in Split Dollar Agreement) and receipt for payment of first year's split-dollar service fee.

The closing package will then go to a Distributor, then to the Client for completion with the assistance of the Producer.

Once completed, the closing package, along with the first year's split-dollar fee, will be returned to the Distributor and on to IPD.

Step 3: Closing Process—goal is to process all paperwork necessary to enroll a Client in the TLE program.

Trustee signs the trust agreement, the split-dollar financing agreement, Loan documents (if not included in Split Dollar Agreement) and collateral assignment.

The change of ownership/beneficiary forms, conversion application, conversion illustration, and any other required documents will be submitted to the converting/issuing carrier.

Upon conversion, the TLE policy will be sent by the carrier to IPD.

The TLE Agent will sign the collateral assignment and note purchase and sale agreement.

IPD will deliver the TLE policy to the Trustee and get a signed delivery receipt for the TLE policy from the Trustee.

The TLF will execute the split dollar financing agreement between the TLF and the trust.

The TLF will issue a check to the carrier for the funds to cover the conversion of the policy into a universal life policy, and the amount of premium to keep the policy in force for the term of the extension period.

IPD will submit the conversion and premium check, along with the collateral assignment to the issuing carrier for processing. This will begin the "Free Look" period. The TLF will cut a separate check to IPD for its fee in processing the transaction.

After recordation, the insurance carrier will send confirmation that the collateral assignment has been filed and accepted.

Step 4: Final Verification—goal is to verify that the entire the closing package has been processed and properly recorded.

A fully executed document package will be sent to each of the involved entities (insured, Distributor, Trustee, TLF (TLF administrator).

Step 5: Administration of Loans and the TLF

The TLF manager will receive split-dollar fees and administer the split-dollar loans until expiration of the TLE program term.

If the insured life under the policy passes during the term, pursuant to the collateral assignment, the TLF will receive repayment of the principal of the split-dollar loan directly from the Insurance Company, and the remaining death benefit will be paid to the Trust for distribution to the beneficiaries named by the Client.

If the insured life does not pass during the term, then at expiration of the term if the Client chose Option 1 the Client can repay the principal of the split-dollar loan and keep the policy. In this event, the Trustee will resign and the Client will appoint his or her own trustee. In the event the Client repays the split-dollar loan, the TLF will have no further rights in or to the policy. If the Client does not repay the loan, then the TLF will have the right to assume ownership of the policy and the Trustee will change the beneficiaries of the trust from those chosen by the Client to the TLF.

If the Client chose Option 2, then at the end of the term the TLF has the right to keep the policy. If the TLF chooses to keep the Policy, the beneficiary of the trust will be changed to the TLF.

In the event the TLF becomes the beneficiary of the trust, upon the passing of the insured life under the policy, the death benefit will be paid to the trust and distributed to the TLF as the trust beneficiary.

For ease of administration, after the expiration of the term of all split-dollar loans, the ownership and beneficiary of all policies which reverted to the fund can be changed from the Trust to the TLF by filing change of ownership and change of beneficiary forms with the issuing insurance carrier.

It will be understood by those skilled in the art that each of the above steps will comprise computer-implemented aspects, performed by one or more of the computer components described herein. For example, communications, billings, and payments may be performed electronically. Calculation of fees (e.g., a term extension fees for an insured) may be performed electronically. Calculations related to life expectancy may be performed electronically. Stochastic modeling may be performed electronically. In at least one exemplary embodiment, all steps may be performed electronically—either by general or special purpose processors implemented in one or more computer systems such as those described herein.

It will be further understood and appreciated by one of ordinary skill in the art that the specific embodiments and examples of the present disclosure are presented for illustrative purposes only, and are not intended to limit the scope of the disclosure in any way.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

Figure 11:
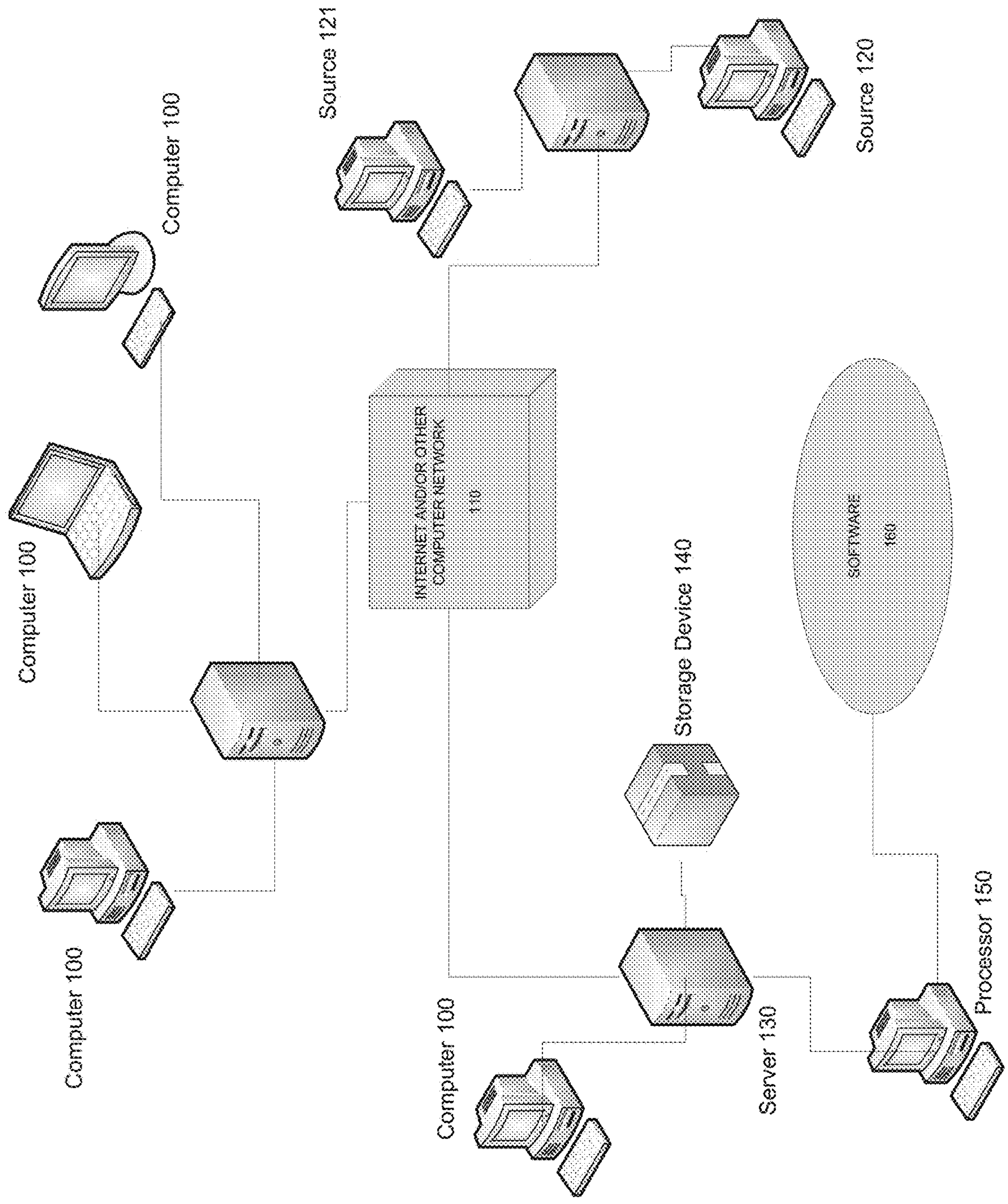
FIG. 11 depicts an exemplary computer system and network.

An exemplary such system is depicted in FIG. 11. Computers 100 communicate via network 110 with a server 130. A plurality of sources of data 120-121 also communicate via network 110 with a server 130, processor 150, and/or other components operable to calculate and/or transmit information. Server(s) 130 may be coupled to one or more storage devices 140, one or more processors 150, and software 160.

Calculations described herein, and equivalents, are, in an embodiment, performed entirely electronically. Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

We claim:

1. An automated computer system comprising:

at least one processor, and at least one non-transitory memory storing a computer executable instructions, which when executed by the at least one processor, causes said processor to operate as:

a receiving component, configured to receive electronic application data for converting a convertible term life insurance policy of a policy owner into a permanent life insurance policy with an insurance company;

an underwriting component and a pricing component, configured to analyze the received electronic application data and determine whether the owner is a qualified customer for the conversion based at least in part on a plurality of customer health and policy qualifications, and to automatically perform an iterative computerized selection of a permanent life insurance policy, financed at least in part by a third party, that best fits a plurality of the determined customer health and policy qualifications, a calculation of a return on investment and cost for the third party, and one or more pricing and cost requirements for the policy owner as part of the pricing component, wherein the determination by the underwriting component comprises an identification of conversion rights in the owner's convertible term life insurance and a determination of the permanent life insurance policy into which the convertible term life insurance may be convertible;

wherein the determination by the pricing component comprises an automated iterative analysis of a mortality assumptions based on the customer health;

and wherein the calculated return on investment and costs for the third party and the pricing and costs for the insured are dependent on the results of the iterative analysis of the mortality assumptions;

a processing component, configured to automatically facilitate conversion of the owner's convertible term life insurance policy into the permanent life insurance policy with the insurance company upon determination that the policy owner is the qualified customer for the conversion into at least one permanent insurance policy of the third party;

a selection component, configured to select the permanent life insurance policy of the third party that best fits the determined, result of the underwriting component and the pricing component processing, wherein the selection component comprises providing and receiving a selection by the policy owner from at least two conversion options, a first option allowing conversion into a policy in which the policy owner may retain ownership, and a second option allowing for conversion into a policy in which the ownership of the policy is assigned to the third party; and a generating component, configured to automatically generate an agreement to be executed between the third party and the policy owner, wherein the generated agreement comprises a plurality of contractual obligations between the third party and the owner for a specified period of time, the obligations including:

a first obligation in which the third party is obligated to pay premiums for the permanent life insurance policy to the insurance company that the owner is otherwise obligated to pay;

a second obligation in which the owner is obligated to pay one or more fees to the third party;

in the event of a selection of the second option, an assignment to the third party a first right to retain the permanent life insurance policy upon expiration of the specified period of time and to receive one or more collateralized payments from an insurance policy benefits, and a calculation of fees that the owner is obligated to pay to the third party.

2. The computer system of claim 1, wherein the determination by the underwriting component also comprises a comparison of a past and current underwriter issue or risk class for the owner policy and a determination whether there has been a shift in the issue or risk class for the policy owner.

3. The computer system of claim 1, wherein the determination by the underwriting component also comprises an analysis of a past and present health status of the owner.

4. The computer system of claim 1, wherein the determination by the pricing component also comprises an automated iterative analysis of the mortality assumptions, an expected rate of return for each permanent life insurance policy that fits a plurality of the determined customer qualifications, the mortality assumptions and one or more pricing and cost requirements.

5. The computer system of claim 1, wherein the pricing component comprise a calculation of an issue expense, a calculation of a policy conversion costs, and a determination of a maintenance fees amount that the policy owner agrees to pay.

6. The computer system of claim 1, wherein the fees that the owner is obligated to pay to the third party are calculated at least partially as a sum of (a) a cash flow value, the cash flow value being a lower numeric value in a case where the first right is assigned to the third party than in a case where the first right is assigned to the owner, (b) expected premiums to be paid by the third party, and (c) expenses to be occurred by the third party in relation to the permanent life insurance policy, less (d) death benefits of the permanent life insurance policy.

7. The computer system of claim 1, wherein the contractual obligations between the third party and the owner for a specified period of time include a right of first refusal, exercisable by either the policy owner or the third party.

8. The computer system of claim 7, wherein in order to exercise said right of first refusal, the policy owner is required to repay premiums paid by the third party, and the assignment of the first right to retain the permanent life insurance policy is executed for the benefit of the policy owner upon repayment of the premiums.

9. The computer system of claim 8, wherein the repayment of the premiums is secured by a collateral assignment recorded with said insurance company, and payment of the fees to the third party is collateralized by a death benefit of the insurance policy.

10. The computer system of claim 7, wherein when the third party exercises the first refusal right, then the assignment is executed for the benefit of the third party and the premiums paid by the third party for the policy owner are deemed repaid upon execution of the assignment by the policy owner or the owner's designated beneficiary.

11. The computer system as in claim 1, wherein if the policy owner dies during a term or an extension period of the insurance policy, while the required premiums are paid by the third party, the third party is repaid the amount of the premiums paid from a death benefit of the insurance policy, and the owner's designated beneficiaries receive at least a portion of the balance of the death benefit.

12. The computer system as in claim 1, wherein the permanent life insurance policy is issued through a split dollar program.

13. A computerized method for automatically facilitating a conversion of an insurance policy, said method comprising:

(1) automatically receiving an electronic application data for converting a convertible term life insurance policy of a policy owner into a permanent life insurance policy with an insurance company;

(2) performing underwriting and pricing processing, to automatically analyze the received electronic data and determine whether the owner is a qualified customer for the conversion based at least in part on a plurality of customer health and policy qualifications, and automatically performing an iterative computerized selection of a permanent life insurance policy, financed at least in part by a third party, that is determined to best fit the determined customer health and policy qualifications, a calculation of a return on investment and cost for the third party, and one or more pricing and cost requirements for the policy owner as part of the pricing processing, wherein the underwriting processing comprises an identification of conversion rights in the owner's convertible term life insurance and a determination of the permanent life insurance policy into which the convertible term life insurance may be convertible;

wherein the determination by the pricing component comprises an automated iterative analysis of a mortality assumptions based on the customer health;

and wherein the calculation of the return on investment and costs for the third party and the pricing and costs for the insured are dependent on the results of the iterative analysis of the mortality assumptions;

(3) automatically facilitating conversion of the owner's convertible term life insurance policy into a permanent life insurance policy with the insurance company upon determination of the owner as the qualified customer for the conversion;

(4) selecting the permanent life insurance policy of the third party that best fits the determined result of the underwriting component and the pricing component processing, wherein the selecting comprises providing and receiving a selection by the policy owner from at least two conversion options, a first option allowing conversion into a policy in which the policy owner may retain ownership, and a second option allowing for conversion into a policy in which the ownership of the policy is assigned to the third party; and (5) automatically generating an agreement to be executed between a third party and the policy owner, wherein the generated agreement comprises a plurality of contractual obligations between the third party and the owner for a specified period of time, the obligations including:

a first obligation in which the third party is obligated to pay premiums for the permanent life insurance policy to the insurance company that the owner is otherwise obligated to pay;

a second obligation in which the owner is obligated to pay one or more fees to the third party;

in the event of a selection of the second option, an assignment to the third party a first right to retain the permanent life insurance policy upon expiration of the specified period of time and to receive one or more collateralized payments from an insurance policy benefits, and a calculation of fees that the owner is obligated to pay to the third party.

14. The method of claim 13, wherein the calculation of fees that the owner is obligated to pay to the third party comprises automatically calculating the one or more fees the owner is obligated to pay to the third party, in part, as a sum of (a) a cash flow value, the cash flow value being a lower numeric value in a case where the first right is assigned to the third party than in a case where the first right is assigned to the owner, (b) expected premiums to be paid by the third party, and (c) expenses to be occurred by the third party in relation to the permanent life insurance policy, less (d) death benefits of the permanent life insurance policy.

15. The method of claim 13, wherein the underwriting processing step comprises performing a comparison of a past and current underwriter issue or risk class for the owner policy and determining whether there has been a shift in the issue or risk class for the policy owner.

16. The method of claim 13, wherein the underwriting processing step comprises an analysis of a past and present health status of the owner.

17. The method of claim 13, wherein the pricing processing comprises an automated iterative analysis of the mortality assumptions, an expected rate of return for each permanent life insurance policy that fits a plurality of the determined customer qualifications, the mortality assumptions and one or more pricing and cost requirements.

18. The method of claim 13, wherein the pricing processing comprises a calculation of an issue expense, a calculation of a policy conversion costs, and a determination of a maintenance fees amount that the policy owner agrees to pay.

19. The method of claim 13, wherein the contractual obligations between the third party and the owner for a specified period of time include a right of first refusal, exercisable by either the policy owner or the third party.

20. The method of claim 19, wherein in order to exercise said right of first refusal, the policy owner is required to repay premiums paid by the third party, and the assignment of the first right to retain the permanent life insurance policy is executed for the benefit of the policy owner upon repayment of the premiums.

21. The method of claim 20, wherein the repayment of the premiums is secured by a collateral assignment recorded with said insurance company, and payment of the fees to the third party is collateralized by a death benefit of the insurance policy.

22. The method of claim 19, wherein when the third party exercises the first refusal right, the assignment is executed for the benefit of the third party and the premiums paid by the third party for the policy owner are deemed repaid upon execution of the assignment by the policy owner or the owner's designated beneficiary.

23. The method of claim 13, wherein if the policy owner dies during a term or an extension period of the insurance policy, while the required premiums are paid by the third party, the third party is repaid the amount of the premiums paid from a death benefit of the insurance policy, and the owner's designated beneficiaries receive at least a portion of the balance of the death benefit.

24. The method of claim 13, wherein the permanent life insurance policy is issued through a split dollar program.

* * * * *